United States Patent
Sigler et al.

(10) Patent No.: US 6,850,497 B1
(45) Date of Patent: Feb. 1, 2005

(54) SATELLITE TRUNKED RADIO SERVICE SYSTEM

(75) Inventors: C. Edward Sigler, Myersville, MD (US); Richard S. Sweet, San Diego, CA (US); Brian Skerry, Chandler, AZ (US); George Davies, White Rock (CA); Dan Bossler, Osgoode (CA); John W. Jones, Ontario (CA)

(73) Assignee: Mobile Satellite Ventures, LP, Reston, VA (US)

( * ) Notice: Subject to any disclaimer, the term of this patent is extended or adjusted under 35 U.S.C. 154(b) by 0 days.

(21) Appl. No.: 09/887,691

(22) Filed: Aug. 29, 1997

Related U.S. Application Data

(63) Continuation of application No. 08/718,133, filed on Sep. 18, 1996, now abandoned.
(60) Provisional application No. 60/003,989, filed on Sep. 19, 1995.

(51) Int. Cl.[7] .................................................. H04B 7/00
(52) U.S. Cl. ...................................... 370/310; 455/57.1
(58) Field of Search ................................ 370/310, 319, 370/328, 329, 344, 252; 455/3.02, 450, 509, 120, 51.2, 57.1

(56) References Cited

U.S. PATENT DOCUMENTS

| | | | |
|---|---|---|---|
| 4,361,886 A | * 11/1982 | Gutleber | ...................... 370/317 |
| 5,303,286 A | 4/1994 | Wiedeman | |
| 5,363,375 A | * 11/1994 | Chuang et al. | ............. 370/332 |
| 5,363,376 A | * 11/1994 | Chuang et al. | ............. 370/332 |
| 5,394,560 A | 2/1995 | Kane | |
| 5,526,404 A | 6/1996 | Wiedeman et al. | |
| 5,586,165 A | 12/1996 | Wiedeman | |
| 5,590,395 A | 12/1996 | Diekelman | |
| 5,594,740 A | 1/1997 | LaDue | |
| 5,594,780 A | 1/1997 | Wiedeman et al. | |
| 5,659,545 A | * 8/1997 | Sowles et al. | ............... 370/324 |
| 5,663,957 A | * 9/1997 | Dent | ........................... 370/347 |

OTHER PUBLICATIONS

International Search Report for PCT, Ser. No. PCT/US96/19165, dated Mar. 10, 1997.
International Search Report for PCT, Ser. No. PCT/US96/19120 dated Mar. 10, 1997.

* cited by examiner

*Primary Examiner*—Ajit Patel
*Assistant Examiner*—Chirag Shah

(57) ABSTRACT

In a mobile satellite system, a system for providing satellite communication between multiple users in a closed user group arrangement includes first and second mobile earth terminals (METs) responsively connecter to and registering with the mobile satellite system. The first MET selects a closed user group network identifier (NET. ID) representing a NET group including the first and second METs to establish voice communication therewith and transmits the NET ID to a central controller. The central controller receives the NET ID from the first MET, validates the first MET for communication, validates the NET ID, allocates a frequency for the NET group, and broadcasts the message to the NET group including the second MET informing the NET group of the allocated frequency and the voice communication associated therewith. The second MET tunes to the frequency in response to the message broadcast by the central controller, and the central controller assigns the first MET as current speaker for the NET group.

23 Claims, 31 Drawing Sheets

| PARAMETER | REQUIREMENT |
|---|---|
| L-BAND AEIRP | 56.6 dBW AT NOISE POWER RATIO OF 18 dB |
| Ku-BAND AEIRP | 36.7 dBW |
| L-BAND RECEIVE G/T | +2.7 dB/°K |
| Ku-BAND RECEIVE G/T | -3.6 dB/°K |
| L-BAND FREQUENCIES | 1530 TO 1559 MHz (TRANSMIT)<br>1631.5 TO 1660.5 MHz (RECEIVE) |
| Ku-BAND FREQUENCIES | 10,750 - 10,950 MHz (CENTRAL SATELLITE TRANSMIT)<br>13,000 - 13,150 MHz &<br>13,200 - 13,250 MHz (CENTRAL SATELLITE RECEIVE)<br>11,700 - 11,900 MHz (WING SATELLITE TRANSMIT)<br>14,000 - 14,200 MHz (WING SATELLITE RECEIVE) |

FIG. 2

| FEATURE | DESCRIPTION |
|---|---|
| NET RADIO SERVICE | THIS FEATURE SHALL PROVIDE A NET RADIO CHANNEL CONFIGURATION FOR THE PURPOSE OF GROUP/SUB-GROUP COMMUNICATIONS. |
| PRIVATE MODE SERVICE | THIS FEATURE SHALL PROVIDE A NET RADIO CHANNEL CONFIGURATION FOR THE PURPOSE OF PRIVATE COMMUNICATIONS BETWEEN TWO CUG MEMBERS. |
| PRIORITY I SERVICE | THIS FEATURE SHALL PERMIT A MOBILE USER IN AN EMERGENCY SITUATION TO INTERRUPT A NET RADIO CALL IN PROGRESS. |
| BROADCAST SERVICE | THIS FEATURE SHALL PROVIDE A BROADCAST CHANNEL CONFIGURATION. |

FIG. 11

| MESSAGE CATEGORY | MSG. NO. HEX | MESSAGE |
|---|---|---|
| NETWORK MANAGEMENT | 41 | NET ID DOWNLOAD |
| | 42 | NET ID ATTRIBUTE |
| CALL CONTROL | 51 | NET RADIO CHANNEL ASSIGNMENT |

FIG. 12

| 8 | 7 | 6 | 5 | 4 | 3 | 2 | 1 | |
|---|---|---|---|---|---|---|---|---|
| 1 | \multicolumn{7}{c|}{MESSAGE TYPE =} | 1 |
| \multicolumn{8}{|c|}{MGSP HEADER} | 2 |
| \multicolumn{8}{|c|}{} | 3 |
| \multicolumn{8}{|c|}{FTIN} | 4 |
| \multicolumn{8}{|c|}{} | 5 |
| \multicolumn{8}{|c|}{} | 6 |
| \multicolumn{8}{|c|}{NET ID} | 7 |
| \multicolumn{8}{|c|}{} | 8 |
| \multicolumn{8}{|c|}{ENCRYPTED NET RADIO ACCESS SECURITY KEY} | 9 |
| | | | | | | | | 10 |
| \multicolumn{8}{|c|}{CRC} | 11 |
| | | | | | | | | 12 |

FIG 13

| PARAMETER | SIZE BITS | FUNCTION |
|---|---|---|
| MGSP HEADER | 8 | HEADER FOR MGSP PROTOCOL |
| FTIN | 24 | FORWARD TERMINAL IDENTIFICATION NUMBER |
| NET ID | 24 | NET RADIO IDENTIFICATION NUMBER |
| ENCRYPTED NET RADIO ACCESS SECURITY KEY (NRASK) | 16 | THIS IS THE NET ID ASK ENCRYPTED USING THE MET's ASK. |

FIG 14

| 8 | 7 | 6 | 5 | 4 | 3 | 2 | 1 | |
|---|---|---|---|---|---|---|---|---|
| 1 | MESSAGE TYPE = | | | | | | | 1 |
| MGSP HEADER | | | | | | | | 2 |
| FTIN | | | | | | | | 3 |
| | | | | | | | | 4 |
| | | | | | | | | 5 |
| OPERATOR | | | | | | | | 6 |
| MON-CODE | | | NET ID TAG | | | | | 7 |
| RECORD FIELD | | | | | | | | 8 |
| | | | | | | | | 9 |
| | | | | | | | | 10 |
| CRC | | | | | | | | 11 |
| | | | | | | | | 12 |

FIG 15

| PARAMETER | SIZE BITS | FUNCTION |
|---|---|---|
| MGSP HEADER | 8 | HEADER FOR MGSP PROTOCOL |
| FTIN | 24 | FORWARD TERMINAL IDENTIFICATION NUMBER |
| OPERATOR | 8 | THIS PARAMETER INDICATES THE OPERATION TO BE PERFORMED.<br>'01' = DE-ALLOCATE THE NET ID GIVEN IN THE RECORD FIELD.<br>'02' = ASSOCIATE THE NET ID GIVEN IN THE RECORD FIELD TO THE SELECTOR POSITION OR MEMORY LOCATION GIVEN BY THE TAG PARAMETER AND ASSIGN THE NET ID THE MONITOR-CODE.<br>'03' = CHANGE THE MET DN TO THE DN GIVEN IN THE RECORD FIELD |
| NET ID TAG | 6 | THIS PARAMETER IS USER DEFINED AND PERMITS A SUBSCRIBER TO TAG A NET ID TO A MEMORY LOCATION OR SELECTOR POSITION AT THE MET.<br>TAG = '00 HEX' FOR THE PRIVATE MODE SERVICE NET ID.<br>TAG = '3F HEX' WHEN NOT USED. |
| MON-CODE | 2 | THIS PARAMETER IS USER DEFINED AND DETERMINES THE ACTION TAKEN BY THE MET WHEN A CHANNEL ASSIGNMENT FOR THE GIVEN NET ID IS RECEIVED WHILE MONITORING THE GC-S CHANNEL.<br>'00' = THE MET SHALL RESPOND TO A CHANNEL ASSIGNMENT FOR THE NET ID ONLY WHEN THE NET ID IS SELECTED BY THE OPERATOR.<br>'01' = THE MET SHALL RESPOND TO A CHANNEL ASSIGNMENT FOR THE NET ID EVEN IF NOT SELECTED BY THE OPERATOR, BUT PROVIDING THE OPERATOR HAS NOT "LOCKED-ON" TO A DIFFERENT NET ID.<br>'11' = THE MET SHALL ALWAYS RESPOND TO A CHANNEL ASSIGNMENT FOR THE NET ID. |
| RECORD FIELD | 24 | THE RECORD FIELD SHALL CONTAIN A 3 BYTE NET ID OR A MET DN REPRESENTED BY 4 HEXIDECIMAL DIGITS AS REQUIRED FOR THE OPERATION. WHEN TRANSMITTED, THE DN SHALL BE CONTAINED IN BYTES 8 AND 9 OF THE SIGNALING UNIT. |

FIG 16

| 8 | 7 | 6 | 5 | 4 | 3 | 2 | 1 | |
|---|---|---|---|---|---|---|---|---|
| 0 | MESSAGE TYPE = | | | | | | | 1 |
| NET ID OR FTIN | | | | | | | | 2 |
| | | | | | | | | 3 |
| | | | | | | | | 4 |
| TRANSMIT FREQUENCY | | | | | | | | 5 |
| | | | | | | | | 6 |
| RECEIVE FREQUENCY | | | | | | | | 7 |
| | | | | | | | | 8 |
| CALL TYPE | | | | | | | | 9 |
| SPARE | | | | | | | | 10 |
| CRC | | | | | | | | 11 |
| | | | | | | | | 12 |

FIG 17

| PARAMETER | SIZE BITS | FUNCTION |
|---|---|---|
| NET ID OR FTIN | 24 | NET RADIO IDENTIFICATION NUMBER FOR NET RADIO SERVICE. FTIN OF THE ADDRESSED MET FOR PRIVATE MODE SERVICE. |
| TRANSMIT FREQUENCY | 16 | TRANSMIT CHANNEL FREQUENCY |
| RECEIVE FREQUENCY | 16 | RECEIVE CHANNEL FREQUENCY |
| CALL TYPE | 8 | '01 HEX' = NET RADIO SERVICE<br>'02 HEX' = PRIVATE MODE SERVICE<br>'03 HEX' = BROADCAST SERVICE |

FIG 18

| MESSAGE CATEGORY | MSG. NO. HEX | MESSAGE |
|---|---|---|
| NETWORK MANAGEMENT | 41 | MET MANAGEMENT ACKNOWLEDGE |
| CALL CONTROL | 51 | NET RADIO ACCESS REQUEST |

FIG. 19

| 8 | 7 | 6 | 5 | 4 | 3 | 2 | 1 | |
|---|---|---|---|---|---|---|---|---|
| 1 | MESSAGE TYPE = | | | | | | | 1 |
| MGSP HEADER | | | | | | | | 2 |
| RTIN | | | | | | | | 3 |
| | | | | | | | | 4 |
| | | | | | | | | 5 |
| SPARE | | | | | | | | 6 |
| | | | | | | | | 7 |
| | | | | | | | | 8 |
| | | | | | | | | 9 |
| | | | | | | | | 10 |
| CRC | | | | | | | | 11 |
| | | | | | | | | 12 |

FIG. 20

| PARAMETER | SIZE BITS | FUNCTION |
|---|---|---|
| MGSP HEADER | 8 | HEADER FOR MGSP PROTOCOL |
| RTIN | 24 | REVERSE TERMINAL IDENTIFICATION NUMBER |

FIG. 21

| 8 | 7 | 6 | 5 | 4 | 3 | 2 | 1 | |
|---|---|---|---|---|---|---|---|---|
| 1 | \multicolumn{7}{c|}{MESSAGE TYPE =} | 1 |

| 8 | 7 | 6 | 5 | 4 | 3 | 2 | 1 | |
|---|---|---|---|---|---|---|---|---|
| 1 | MESSAGE TYPE = | | | | | | | 1 |
| MGSP HEADER | | | | | | | | 2 |
| RTIN | | | | | | | | 3 |
| | | | | | | | | 4 |
| | | | | | | | | 5 |
| NET ID | | | | | | | | 6 |
| | | | | | | | | 7 |
| | | | | | | | | 8 |
| MET DN (DIGIT 2) | | | | MET DN (DIGIT 1) | | | | 9 |
| MET DN (DIGIT 4) | | | | MET DN (DIGIT 3) | | | | 10 |
| CRC | | | | | | | | 11 |
| | | | | | | | | 12 |

FIG. 22

| PARAMETER | SIZE BITS | FUNCTION |
|---|---|---|
| MGSP HEADER | 8 | HEADER FOR MGSP PROTOCOL |
| RTIN | 24 | REVERSE TERMINAL IDENTIFICATION NUMBER |
| NET ID | 24 | NET RADIO INDENTIFICATION NUMBER |
| MET DN (DIGIT n) | 4 | DIGIT n = 'F HEX' FOR NET RADIO SERVICE<br><br>DIGIT n = HEXIDECIMAL REPRESENTATION OF THE nth DIGIT OF THE CALLED MET DIRECTORY NUMBER FOR PRIVATE MODE SERVICE<br><br>DIGITS 1 TO 4 = 'E911 HEX' FOR PRIORITY 1 SERVICE. |

FIG. 23

| MESSAGE CATEGORY | MSG. NO. HEX | MESSAGE |
|---|---|---|
| CALL CONTROL | 41 | NET RADIO |
| | 42 | NET RADIO CALL RELEASE |
| | 43 | COMMAND (RESERVED FOR FUTURE REQUIREMENTS) |

FIG. 24

| PARAMETER | SIZE BITS | FUNCTION |
|---|---|---|
| NET ID | 24 | IDENTIFIES THE NET INDENTIFICATION FOR THE NETRADIO CALL. |
| MET DN (DIGIT n) | 4 | IDENTIFIES THE MET'S DN. |
| REQUEST TYPE | 8 | IDENTIFIES THE TYPE OF REQUEST WHERE:<br>'00 HEX' IS A PTT REQUEST<br>'01 HEX' IS A PTT RELEASE<br>'10 HEX' IS A PRIORITY 1 PTT REQUEST |

FIG. 25

| TIMER | DESCRIPTION | TIMING REQUIREMENTS |
|---|---|---|
| $T_M20$ | LOST FES-C CHANNEL TIMEOUT | EQUAL TO $T_M6$ |
| $T_M21$ | LOST SPEAKER STATUS TIMEOUT | 3 SECONDS |
| $T_M22$ | TRANSMITTER INHIBIT TIMEOUT | 1 FES-C CHANNEL SUPERFRAME (ABOUT 1/2 SECOND) |
| $T_M23$ | CONTENTION WINDOW TIMEOUT | 1 SECOND |
| $T_M24$ | ACCESS REQUEST TIMEOUT | 2 SECONDS |

FIG. 26

| MONITOR CODE | FUNCTION |
|---|---|
| 00 | THE MET SHALL RESPOND TO NET IDs WITH THIS MONITOR CODE ONLY WHEN THE OPERATOR HAS SELECTED THIS NET ID. |
| 01 | THE MET SHALL RESPOND TO NET IDs WITH THIS MONITOR CODE PROVIDED THE OPERATOR HAS NOT "LOCKED ON" TO ANOTHER NET ID. |
| 11 | THE MET SHALL ALWAYS RESPOND TO NET IDs WITH THIS MONITOR CODE. |

FIG. 27

KEY

FLOW ON ALL VERTICAL SEGMENTS GOES FROM TOP TO BOTTOM ONLY.

— BOLD LINES REPRESENT THE NORMAL CALL SETUP PATH.

— OTHER PATHS ARE REPRESENTED BY LIGHTER LINES.

Ⓘ CIRCLED NUMBERS REPRESENT THE STARTING POINT OR THE DESTINATION POINT OF A GO TO.

△D LETTERS IN TRIANGLES REPRESENT CONTINUATION POINTS BETWEEN PAGES.

*GC-FES CHANNEL ASSIGNMENT* ALL SIGNALING UNITS ARE DEPICTED IN ITALICS.

*GC-MET\* CHANNEL ASSIGNMENT* UNACKNOWLEDGED MGSP MESSAGES ARE DENOTED BY ONE *.

⊠ THIS SYMBOL, WHEN REACHED IN A PARTICULAR EPOCH, INDICATES THAT THE PROCESS HAS ENDED FOR THAT PARTICULAR ENTITY.

FIG. 30

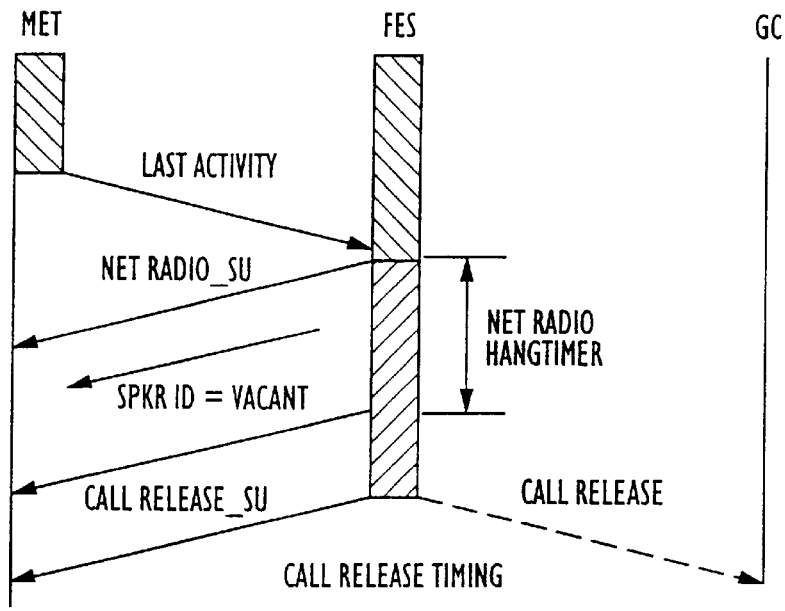
FIG.34(a)
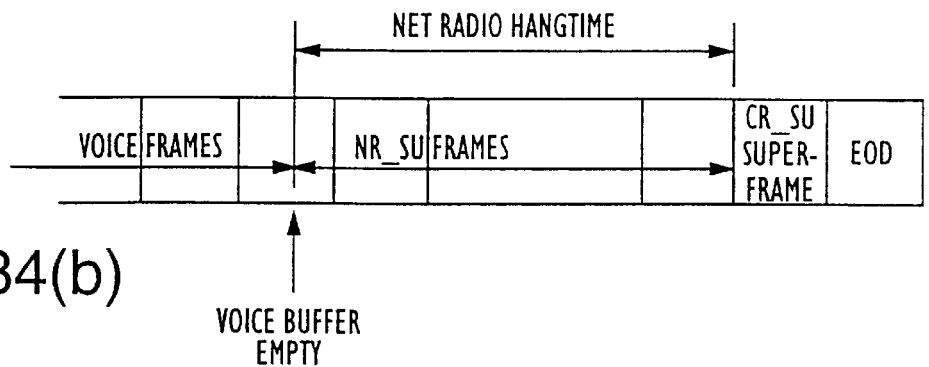
FIG.34(b)
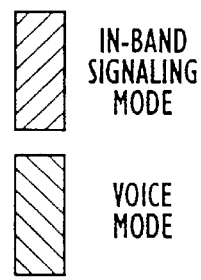
FIG.34(c) MODE OF FES-C CHANNEL DURING CALL RELEASE

GLOSSARY

| | |
|---|---|
| APCO | ASSOCIATED PUBLIC SAFETY COMMUNICATIONS OFFICERS, INC. |
| ASK | ACCESS SECURITY KEY |
| CRC | |
| CUG | CLOSED USER GROUP |
| DN | DIRECTORY NUMBER |
| FES | FEEDERLINK EARTH STATION |
| FTIN | FORWARD TERMINAL IDENTIFICATION NUMBER |
| LLS | LOWER LEVEL SPECIFICATION |
| MET | MOBILE EARTH TERMINAL |
| MGSP | MET-GC SIGNALING PROTOCOL |
| MMA | MET MANAGEMENT ACKNOWLEDGEMENT |
| MRS | MOBILE RADIO SERVICE |
| MTS | |
| NA | NET ID ATTRIBUTE |
| NCC | NETWORK CONTROL CENTER |
| NID | NET ID DOWNLOAD |
| NRACR | NET RADIO ACCESS REQUEST |
| NRCHA | NET RADIO CHANNEL ASSIGNMENT |
| NRCR | NET RADIO CALL RELEASE |
| PTT | PUSH-TO-TALK |
| SU | SIGNALING UNIT |
| TLS | TOP LEVEL SPECIFICATION |
| TMI | TELESAT MOBILE INC. |

FIG. 38

SATELLITE TRUNKED RADIO SERVICE SYSTEM

RELATED APPLICATION

This application is a continuation of application Ser. No. 08/718,133 filed Sep. 18, 1996 now abandoned.

This application claims priority from U.S. provisional application Ser. No. 60/003,989 filed on Sep. 19, 1995 entitled "Satellite Trunked Radio Service System."

TECHNICAL FIELD

The present invention relates generally to a satellite trunked radio service system for satellite communication, and more particularly, to a satellite trunked radio service system for satellite communication utilizing a shared satellite demand period circuit associated with private voice networks.

BACKGROUND ART

An overview of the satellite network system is illustrated in FIG. 1. The satellite network system design provides the capability for METs and FESs to access one or more multiple beam satellites located in geostationary orbit to obtain communications services.

The heart of the satellite network system for each of the networks is the Network Control System (NCS) which monitors and controls each of the networks. The principal function of the NCS is to manage the overall satellite network system, to manage access to the satellite network system, to assign satellite circuits to meet the requirements of mobile customers and to provide network management and network administrative and call accounting functions.

The satellites each transmit and receive signals to and from METs at L-band frequencies and to and from Network Communications controllers (NCCs) and Feederlink Earth Stations (FESs) at Ku-band frequencies. Communications at L-band frequencies is via a number of satellite beams which together cover the service area. The satellite beams are sufficiently strong to permit voice and data communications using inexpensive mobile terminals and will provide for frequency reuse of the L-band spectrum through inter-beam isolation. A single beam generally covers the service area.

The satellite network system provides the capability for mobile earth terminals to access one or more multiple beam satellites located in geostationary orbit for the purposes of providing mobile communications services. The satellite network system is desired to provide the following general categories of service:

Mobile Telephone Service (MTS). This service provides point-to-point circuit switched voice connections between mobile and public switched telephone network (PSTN) subscriber stations. It is possible for calls to be originated by either the mobile terminal or terrestrial user. Mobile terminal-to-mobile terminal calls are also supported.

Mobile Radio Service (MRS). This service provides point-to-point circuit switched connections between mobile terminal subscriber stations and subscriber stations in a private network (PN) which is not a part of the PSTN. It is possible for calls to be originated from either end. Mobile terminal-to-mobile terminal calls are also supported.

Mobile Telephone Cellular Roaming Service (MTCRS). This service provides Mobile Telephone Service to mobile subscribers who are also equipped with cellular radio telephones. When the mobile terminal is within range of the cellular system, calls are serviced by the cellular system. When the mobile terminal is not in range of the cellular system, the MTCRS is selected to handle the call and appears to the user to be a part of the cellular system. When the mobile terminal is not in range of the cellular system, the MTCRS is selected to handle the call and appears to the user to be a part of the cellular system. It is possible for calls to be originated either from the MET or the PSTN. Mobile terminal-to-mobile terminal calls are also supported.

Mobile Data Service (MDS). This service provides a packet switched connection between a data terminal equipment (DTE) device at a mobile terminal and a data communications equipment (DCE)/DTE device connected to a public switched packet network. Integrated voice/data operation is also supported.

The satellites are designed to transmit signals at L-band frequencies in the frequency band 1530–1559 MHz. They will receive L-band frequencies in the frequency band 1631.5–1660.5 MHz. Polarization is right hand circular in both bands. The satellites will also transmit in the Ku frequency band, 10,750 MHz to 10,950 MHz, and receive Ku-band signals in the frequency band 13,000 to 13,250 MHz.

The satellite transponders are designed to translate communications signals accessing the satellite at Ku-band frequencies to an L-band frequency in a given beam and vice versa. The translation will be such that there is a one-to-one relation between frequency spectrum at Ku-band and frequency spectrum in any beam at L-band. The satellite transponders will be capable of supporting L-band communications in any portion of the 29 MHz allocation in any beam.

Transponder capacity is also provided for Ku-band uplink to Ku-band down-link for signalling and network management purposes between FESs and NCCs. The aggregate effective isotropic radiated power (AEIRP) is defined as that satellite e.i.r.p. that would result if the total available communications power of the communications subsystem was applied to the beam that covers that part of the service area. Some of the key performance parameters of the satellite are listed in FIG. 2.

The satellite network system interfaces to a number of entities which are required to access it for various purposes. FIG. 3 is a context diagram of the satellite network system illustrating these entities and their respective interfaces. Three major classes of entities are defined as user of communications services, external organizations requiring coordination, and network management system.

The users of satellite network communications services are MET users who access the satellite network system either via terrestrial networks (PSTN, PSDN, or Private Networks) or via METs for the purpose of using the services provided by the system FES Owner/Operators are those organizations which own and control FESs that provide a terrestrial interface to the satellite network. When an FES becomes a part of the satellite network, it must meet specified technical performance criteria and interact with and accept real-time control from the NCCs. FES Owner/Operators determine the customized services that are offered and are ultimately responsible for the operation and maintenance of the FES. Customers and service providers interact with the Customer Management Information System within the Network Management System.

The satellite network system interfaces to, and performs transactions with, the external organizations described below:

Satellite Operations Center (SOC): The SOC is not included in the satellite network ground segment design. However, the satellite network system interfaces with the SOC in order to maintain cognizance of the availability of satellite resources (e.g. in the event of satellite health problems, eclipse operations, etc.) and, from time to time, to arrange for any necessary satellite reconfiguration to meet changes in traffic requirements.

NOC: The satellite network system interfaces with the satellites located therein via the NOC for a variety of operational reasons including message delivery and coordination.

Independent NOCs: The satellite network system interfaces with outside organizations which lease resources on satellite network satellites and which are responsible for managing and allocating these resources in a manner suited to their own needs.

Other System NOCs: This external entity represents outside organizations which do not lease resources on satellite network satellites but with whom operational coordination is required.

The satellite network management system (NMS) is normally located at an administration's headquarters and may comprise three major functional entities; Customer Management Information System (CMIS), Network Engineering, and System Engineering (NE/SE). These entities perform functions necessary for the management and maintenance of the satellite network system which are closely tied to the way the administration intends to do business. The basic functions which are performed by CMIS, Network Engineering, and System Engineering are as follows:

Customer Management Information System: This entity provides customers and service providers with assistance and information including problem resolution, service changes, and billing/usage data. Customers include individual MET owners and fleet managers of larger corporate customers. Service providers are the retailers and maintenance organizations which interact face to face with individual and corporate customers.

Network Engineering: This entity develops plans and performs analysis in support of the system. Network Engineering analyzes the requirements of the network. It reconciles expected traffic loads with the capability and availability of space and ground resources to produce frequency plans for the different beams within the system. In addition, Network Engineering defines contingency plans for failure situations.

System Engineering: This entity engineers the subsystems, equipment and software which is needed to expand capacity to meet increases in traffic demands and to provide new features and services which become marketable to subscribers.

The satellite network system comprises a number of system elements and their interconnecting communications links as illustrated in FIG. 4. The system elements are the NOC, the NCC, the FES, the MET, the Remote Monitor Station (RMS), and the System Test Station (STS). The interconnecting communications links are the satellite network Internetwork, terrestrial links, the MET signaling channels, the Interstation signaling channels, and the MET-FES communications channels. The major functions of each of the system elements are as follows:

NOC. The NOC manages and controls the resources of the satellite network system and carries out the administrative functions associated with the management of the total satellite network system. The NOC communicates with the various internal and external entities via a local area network (LAN)/wide area network (WAN) based satellite network Internetwork and dial-up lines.

NCC. The NCC manages the real time allocation of circuits between METs and FESs for the purposes of supporting communications. The available circuits are held in circuit pools managed by Group Controllers (GCs) within the NCC. The NCC communicates with the NOC via the satellite network Internetwork, with FESs via Ku-to-Ku band interstation signaling channels or terrestrial links, and with mobile terminals via Ku-to-L band signaling channels.

FES. The FES supports communications links between METs, the PSTN, private networks, and other MTs. Once a channel is established with an MET, call completion and service feature management is accomplished via In-Band signaling over the communication channel. Two types of FESs have been defined for the satellite network system; Gateway FESs and Base FESs. Gateway FESs provide MTS, MRS, MTCRS and NR services. Base FESs are for like services and/or value added services.

MET. The MET provides the mobile user access to the communications channels and services provided by the satellite network system. A range of terminal types has been defined for the satellite network system.

RMS. The RMS monitors L-band RF spectrum and transmission performance in specific L-band beams. An RMS is nominally located in each L-band beam. Each RMS interfaces with the NOC via either a satellite or terrestrial link.

STS. The STS provides an L-band network access capability to support FES commissioning tests and network service diagnostic tests. The STS is collocated with, and interfaced to, the NOC.

Communications channels transport voice, data and facsimile transmissions between METs and FESs via the satellite. Connectivity for MET-to-MET calls is accomplished by double hopping the communications channels via equipped FESs. Signaling channels are used to set up and tear down communications circuits, to monitor and control FES and MET operation, and to transport other necessary information between network elements for the operation of satellite network. The system provides Out-of-Band and Interstation signaling channels for establishing calls and transferring information. In-Band signaling is provided on established communications channels for supervisory and feature activation purposes. A detailed description of the satellite network signaling system architecture is provided in L. White, et al., "North American Mobile Satellite System Signaling Architecture," AIAA 14th International Communications Satellite Conference, Washington, D.C. (March 1992), incorporated herein by reference.

The satellite network Internetwork provides interconnection among the major satellite network ground system elements such as the NOCs, NCCs, and Data Hubs, as well as external entities. Various leased and dial-up lines are used for specific applications within the satellite network system such as backup interstation links between the NCC and FESs and interconnection of RMSs with the NOC.

The primary function of the NOC is to manage and control the resources of the satellite network system. FIG. 5 is a basic block diagram of the NOC and its interface. The NOC computer is shown with network connections, peripheral disks, fault tolerant features, and expansion capabilities to accommodate future growth. The NOC software is represented as two major layers, a functional layer and a support layer. The functional layer represents the application specific portion of the NOC software. The support layer represents software subsystems which provide a general class of services and are used by the subsystems in the functional layer.

The application specific functions performed by the NOC are organized according to five categories: fault management, accounting management, configuration management, performance management, and security management. The general NCC Terminal Equipment (NCCTE) configuration showing constituent equipment includes: processing equipment, communications equipment, mass storage equipment, man-machine interface equipment, and optional secure MET Access Security Key (ASK) storage equipment. The Processing Equipment consists of one or more digital processors that provide overall NCC control, NCS call processing, network access processing and internetwork communications processing.

The Communications Equipment consists of satellite signaling and communications channel units and FES terrestrial communication link interface units. The Mass Storage Equipment provides NCC network configuration database storage, call record spool buffering an executable program storage. The Man-Machine Interface Equipment provides operator command, display and hard copy facilities, and operator access to the computer operating systems. The MET ASK storage Equipment provides a physically secure facility for protecting and distributing MET Access Security Keys.

The NCCTE comprises three functional subsystems: NCCTE Common Equipment Subsystem, Group Controller Subsystem, and Network Access Subsystem. The NCCTE Common Equipment subsystem comprises an NCC Controller, NCCTE mass storage facilities, and the NCCTE man-machine interface. The NCC Controller consists of processing and database resources which perform functions which are common to multiple Group Controllers. These functions include satellite network Internetwork communications, central control and monitoring of the NCCTE and NCCRE, storage of the network configuration, buffering of FES and Group Controller call accounting data, transfer of transaction information to the Off-line NCC and control and monitoring of FESs.

The Mass Storage element provides NCC network configuration database storage, call accounting data spool buffering, and NCCTE executable program storage. The Man-machine Interface provides Operator command and display facilities for control and monitoring of NCC operation and includes hard copy facilities for logging events and alarms. A Group Controller (GC) is the physical NCC entity consisting of hardware and software processing resources that provides real time control according to the CG database received from the NOC.

The Group Controller Subsystem may incorporate one to four Group Controllers. Each Group Controller maintains state machines for every call in progress within the Control Group. It allocates and de-allocates circuits for FES-MET calls within each beam of the system, manages virtual network call processing, MET authentication, and provides certain elements of call accounting. When required, it provides satellite bandwidth resources to the NOC for AMS (R)S resource provisioning. The Group Controller monitors the performance of call processing and satellite circuit pool utilization. It also performs MET management, commissioning and periodic performance verification testing.

The Network Access Subsystem consists of satellite interface channel equipment for Out-of-Band signaling and Interstation Signaling which are used to respond to MET and FES requests for communications services. The Network Access Processor also includes MET communications interfaces that are used to perform MET commission testing. In addition, the subsystem includes terrestrial data link equipment for selected FES Interstation Signaling.

The principal function of the FES is to provide the required circuit switched connections between the satellite radio channels, which provide communications links to the mobile earth terminals, and either the PSTN or PN. FESs will be configured as Gateway Stations (GS) to provide MTS and MTCRS services or Base Stations to provide MRS and Net Radio services (described in detail below) Gateway and Base functions can be combined in a single station.

The FES operates under the real time control of the Network Communications Controller (NCC) to implement the call set-up and take-down procedures of the communications channels to and from the METs. Control of the FES by the NCC is provided via the interstation signaling channels. An FES will support multiple Control Groups and Virtual Networks. The FES is partitioned into two major functional blocks, the FES RF Equipment (FES-RE) and the FES Terminal Equipment (FES-TE). The principal function of the FES-RE is to provide the radio transmission functions for the FES. In the transmit direction it combines all signals from the communications and interstation signaling channel unit outputs from the FES-TE, and amplifies them and up-convert these to Ku-Band for transmission to the satellite via the antenna. In the receive direction, signals received from the satellite are down-converted from Ku-Band, amplified and distributed to the channel units within the FES-TE. Additional functions include satellite induced Doppler correction, satellite tracking and uplink power control to combat rain fades.

The principal function of the FES-TE is to perform the basic call processing functions for the FES and to connect the METs to the appropriate PSTN or PN port. Under control of the NCC, the FES assigns communications channel units to handle calls initiated by MET or PSTN subscribers. The FES-TE also performs alarm resorting, call detail record recording, and provision of operator interfaces.

For operational convenience, an FES may in some cases be collocated with the NCC. In this event, the NCC RF Equipment will be shared by the two system elements and the interstation signaling may be via a LAN. Connection to and from the PSTN is via standard North American interconnect types as negotiated with the organization providing PSTN interconnection. This will typically be a primary rate digital interconnect. Connection to and from private networks is via standard North American interconnect types as negotiated with the organization requesting satellite network service. This will typically be a primary rate digital interconnect for larger FESs or an analog interconnect for FESs equipped with only a limited number of channels may be employed.

We have discovered that there is a general need for an integrated mobile telephone that can be used to transmit to, and receive from, to communicate in a Closed User Group (CUG) arrangement that allows each member of the group to hear what any other user is saying. Each member of the group can also talk when needed. The system behaves like a radio multi-party line where several parties communicate over the same communication channel. Public services and law enforcement agencies are typical users of this service, which is normally provided by either traditional terrestrial radio networks or by the more recent trunked radio systems. These trunked systems, generally in the 800–900 MHz band, provide groups of end users with virtual private systems by assigning frequencies to CUGs on a demand basis. In this connection, however, we have discovered that an integrated mobile communication device is needed that provides this ability to communicate in a CUG of a satellite network. Further, we have discovered that if this type of satellite trunking utilizes a shared satellite demand period circuit per CUG rather than one circuit per mobile user, the cost per minute of a group conversation would be much less expensive to the owner of the group.

We have also discovered that the call set-up time for one shared circuit per CUG compared to a mobile radio service multi-user conference set-up time is likely to be more acceptable to a group end user/operator, who normally expects to be able to talk as soon as the handset/microphone is taken off-hook. Further, we have discovered the need for a nationwide and regional point-to-multipoint mobile communication service that is not limited in coverage.

SUMMARY OF THE INVENTION

It is a feature and advantage of the present invention to provide an integrated mobile telephone that can be used to transmit and receive in a Closed User Group (CUG) arrangement that allows each member of the group to hear what any other user is saying.

It is another feature and advantage of the present invention to permit each member of the group to talk when needed, and to provide a system that behaves like a radio multi-party line.

It is a further feature and advantage of the present invention to provide an integrated mobile communication device that can communicate in a CUG of a satellite network.

It is another feature and advantage of the present invention to provide an inexpensive satellite trunking service to the owner of the group.

It is another feature and advantage of the present invention to minimize the call set-up time for one shared circuit per CUG.

It is another feature and advantage of the present invention to generally effectively and efficiently effectuate transmissions between mobile communication devices and the satellite network in a closed user group environment by utilizing an efficient communication protocol.

It is another feature and advantage of the invention to provide a nationwide and regional point-to-multipoint mobile communication service that is not limited in coverage.

The present invention is based, in part, on the desirability of providing point-to-multipoint circuit switched connections between mobile terminal subscriber stations and a central base station. Mobile users are able to listen to two-way conversations and to transmit using a push-to-talk mode of operation.

To achieve these and other features and advantages of the present invention, a mobile communication system is provided in a mobile satellite system. The mobile satellite system includes a satellite communication switching office having a satellite antenna for receiving/transmitting a satellite message via a satellite from/to a vehicle using a mobile communication system, a satellite interface system, a central controller receiving/transmitting the satellite message from/to the satellite communication switching office issued from the vehicle via the satellite and the satellite interface system. The mobile communication system includes a user interface system providing a user interface through which a user has access to services supported by the mobile satellite system, and an antenna system providing an interface between the mobile communication system and the mobile satellite system via the satellite interface system, and receiving a first satellite message from the satellite and transmitting a second satellite message to the satellite. The antenna system includes an antenna including one of a directional and an omnidirectional configuration, a diplexer, an amplifier, a low noise amplifier, a beam steering unit when the antenna is of the directional configuration, and at least one of a compass and sensor to determine vehicle orientation. The mobile communication system also includes a transceiver system, operatively connected to the antenna system, including a receiver and a transmitter. The transmitter converts the second satellite message including at least one of voice, data, fax and signaling signals into a modulated signal, and transmits the modulated signal to the antenna system. The transmitter includes an amplifier, a first converter and associated first frequency synthesizer, a modulator, an encoder, multiplexer, scrambler and frame formatter for at least one of voice, fax, and data. The receiver accepts the first satellite message from the antenna system and converts the first satellite message into at least one of voice, data, fax and signaling signals, at least one of the voice, data and fax signals routed to the user interface system. The receiver includes a second converter with an associated second frequency synthesizer, a demodulator, a decoder, demultiplexer, descrambler and frame unformatter for at least one of voice, fax, and data. The mobile communication system also includes a logic and signaling system, operatively connected to the transceiver, controlling initialization of the mobile communication system, obtaining an assigned outbound signaling channel from which updated system information and commands and messages are received. The logic and signaling system configures the transceiver for reception and transmission of at least one of voice, data, fax and signaling messages, and controls protocols between the mobile communication system and the mobile satellite system, and validating a received signalling messages and generating codes for a signaling message to be transmitted.

In one embodiment of the invention, a system for providing satellite communication between multiple users in a closed user group arrangement includes first and second mobile earth terminals (METs) responsively connected to and registering with the mobile satellite system. The first MET selects a closed user group network identifier (NET ID) representing a NET group including the first and second METs to establish voice communication therewith and transmits the NET ID to a central controller. The central controller receives the NET ID from the first MET, validates the first MET for communication, validates the NET ID, allocates a frequency for the NET group, and broadcasts the message to the NET group including the second MET informing the NET group of the allocated frequency and the voice communication associated therewith. The second MET tunes to the frequency in response to the message broadcast by the central controller, and the central controller assigns the first MET as current speaker for the NET group.

In another embodiment of the invention, a method of providing satellite communication between multiple users in a closed user group arrangement includes the steps of first and second mobile earth terminals (METs) registering with the mobile satellite system, the first MET selecting a closed user group network identifier (NET ID) representing a NET group including the first and second METs to establish voice communication therewith. The method also includes the steps of the first MET transmitting the NET ID to the central controller, the central controller receiving the NET ID, validating the first MET for communication, validating the NET ID, allocating a frequency for the NET group, and broadcasting the message to the NET group including the second MET informing the NET group of the allocated frequency and the voice communication associated therewith. The method also includes the steps of the second MET tuning to the frequency in response to the message broadcast by the central controller, and assigning by the central controller the first MET as current speaker for the NET group.

In another embodiment of the invention, the method also includes the step of monitoring by the first and second METs whether at least one of a dispatcher message, a priority message and a release of speaker message has been issued, and if so, interrupting the current speaker with the at least one of the dispatcher message, the priority message and a new speaker. The method also includes the steps of monitoring by the central controller whether the current speaker is active, and if not, removing the current speaker and setting the current speaker to vacant, notifying by the central controller the first and second METs that the current speaker is vacant, and initiating by one of the first and second METs a request to be the new speaker. The method further includes the steps of receiving by the central controller the request from a first of the one of the first and second METs to be the new speaker, and assigning the first of the one of the first and second METs as the new speaker, and releasing the closed user group communication when no request from the one of the first and second METs is made to be the new speaker for a predetermined period of time.

In another embodiment of the invention, the method also includes the steps of a third MET included in the NET group registering with the mobile satellite system, and the central controller broadcasting the message to the NET group including the third MET informing the NET group of the allocated frequency and the voice communication associated therewith. The method also includes the steps of the third MET tuning to the frequency in response to the message broadcast by the central controller by generating a scrambling vector for access thereto. The third MET gains access to the frequency and the voice communication of the NET group using the scrambling vector.

According to the invention, the central controller advantageously controls the closed user group satellite communication including net radio parameters used by the first and second METs. The central controller also selectively downloads the NET IDs to the first and second METs according to predetermined user criteria.

The central controller advantageously collects billing information regarding the closed user group satellite communication and transmits the billing information to the mobile satellite system. The mobile satellite system optionally charges a service fee to a customer that has requested the closed user group arrangement instead of each of the individual users in the NET group thereby consolidating the billing transactions and permitting a single customer to monitor communication charges.

In another embodiment of the invention, the method includes the steps of a non-MET accessing the mobile satellite system via either a public switched telephone network or a cellular network to initiate a closed user group communication with the NET group including at least one of the first and second METs, the central controller broadcasting the message to the NET group informing the NET group of the allocated frequency and the voice communication associated therewith, and the at least one of the first and second METs tuning to the frequency in response to the message broadcast by the central controller to communicate with the non-MET in the closed user group arrangement.

In another embodiment of the invention, the method includes the steps of the first MET selecting the closed user group network identifier (NET ID) representing a NET group including the first MET and a non-MET serviced by one of a public switched telephone network and a cellular network to establish voice communication therewith, and the first MET transmitting the NET ID to the central controller. Additionally, the method includes the central controller receiving the NET ID, determining that the NET group includes the non-MET, and broadcasting a non-MET message to either the public switched telephone network or the cellular network including the voice communication associated therewith, and either the public switched telephone network or the cellular network receiving the non-MET message from the central controller and transmitting the non-MET message to the non-MET to establish the closed user group arrangement between the MET and the non-MET.

The first MET beneficially includes a push to talk (PTT) device for generating the release of speaker message. The first MET activates the PTT device generating a PTT signal only when the PTT device is activated after the current speaker is vacant, relieving congestion on the satellite by selectively transmitting the PTT signal.

The central controller advantageously selectively downloads monitor codes to the first and second METs according to predetermined user criteria. The monitor code functions to lock the first and second METs to the NET group preventing the NET group from being released when no request has been made by the first or second METs to be the current speaker after the predetermined period of time.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 2 is a diagram illustrating key performance parameters of the satellite used in the satellite network system;

FIG. 11 illustrates the service categories for Net Radio;

FIG. 12 illustrates the additional GC-S messages in each group;

FIG. 13 is an illustration of the format of the NID_SU;

FIG. 14 is an illustration of the content of the NID-SU;

FIG. 15 is an illustration of the format of the NA_SU;

FIG. 16 is an illustration of the content of the NA_SU;

FIG. 17 is an illustration of the format of the NRCHA_SU;

FIG. 18 is an illustration of the content of the NRCHA-SU;

FIG. 19 is an illustration of the MET-ST messages that are of the Network Management Category;

FIG. 20 is an illustration of the format of the MMA_SU;

FIG. 21 is an illustration of the content of the MMA-SU;

FIG. 22 is an illustration of the format of the NRACR_SU;

FIG. 23 is an illustration of the content of the NRACR-SU;

FIG. 24 is an illustration identifying the messages in each call control group;

FIG. 25 is an illustration of the content of the PTT-SU;

FIG. 26 is an illustration identifying MET timing requirements;

FIG. 27 is an illustration identifying MET call monitor codes;

FIG. 30 is an illustration of a symbol key for use in the various figures including the event tree figures;

FIGS. 34(a), (b) and (c) are an illustration of a Net Radio call release message flow and frame structure;

FIG. 38 is a glossary of commonly used acronyms.

BEST MODE FOR CARRYING OUT THE INVENTION

The present invention provides point-to-multipoint circuit switched connections between mobile terminal subscriber stations and a central base station. Mobile users are able to listen to two-way conversations and to transmit using a push-to-talk mode of operation.

Figure 1:
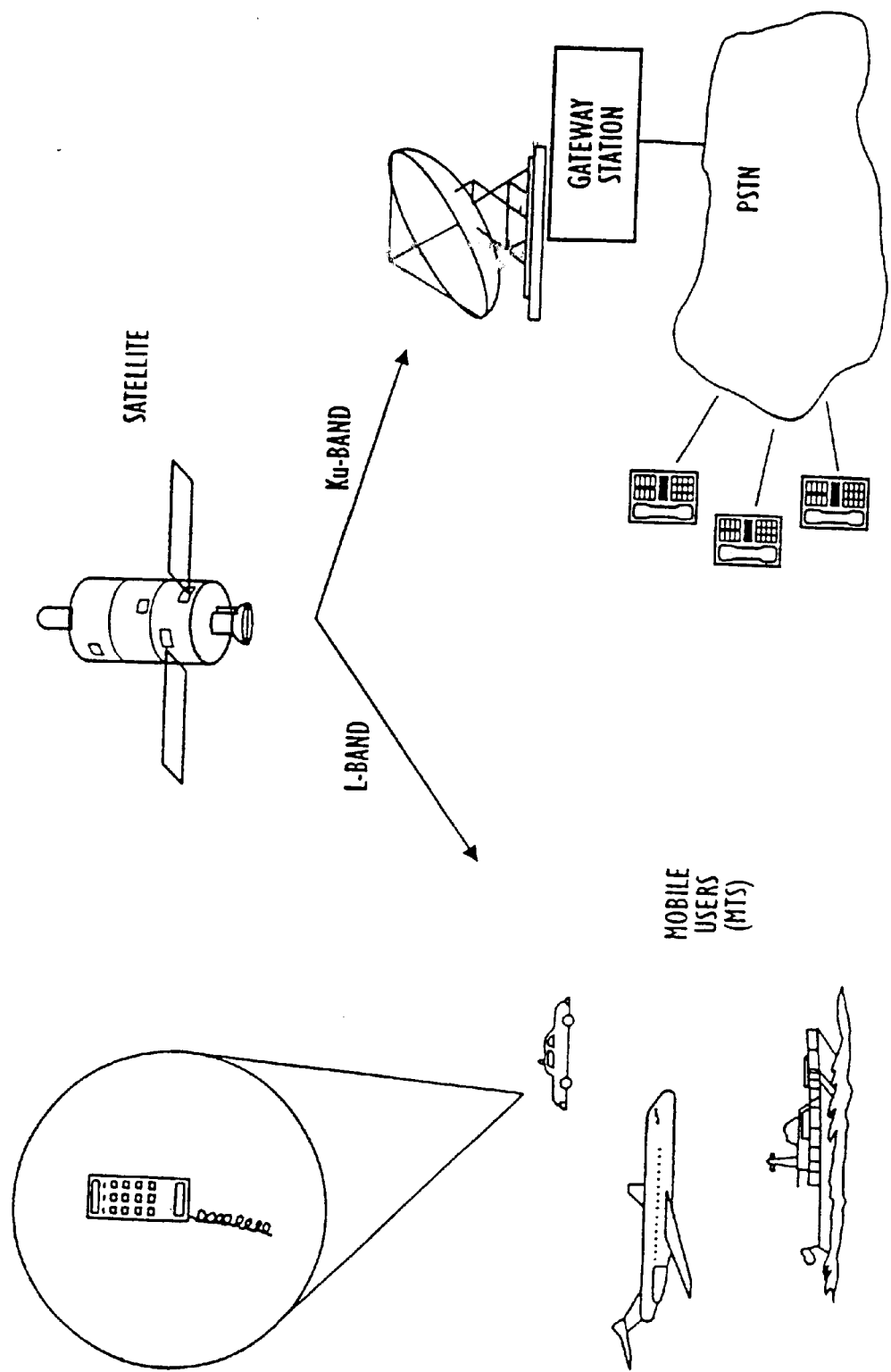
FIG. 1 is a diagram illustrating an overview of the satellite network system.
Figure 3:
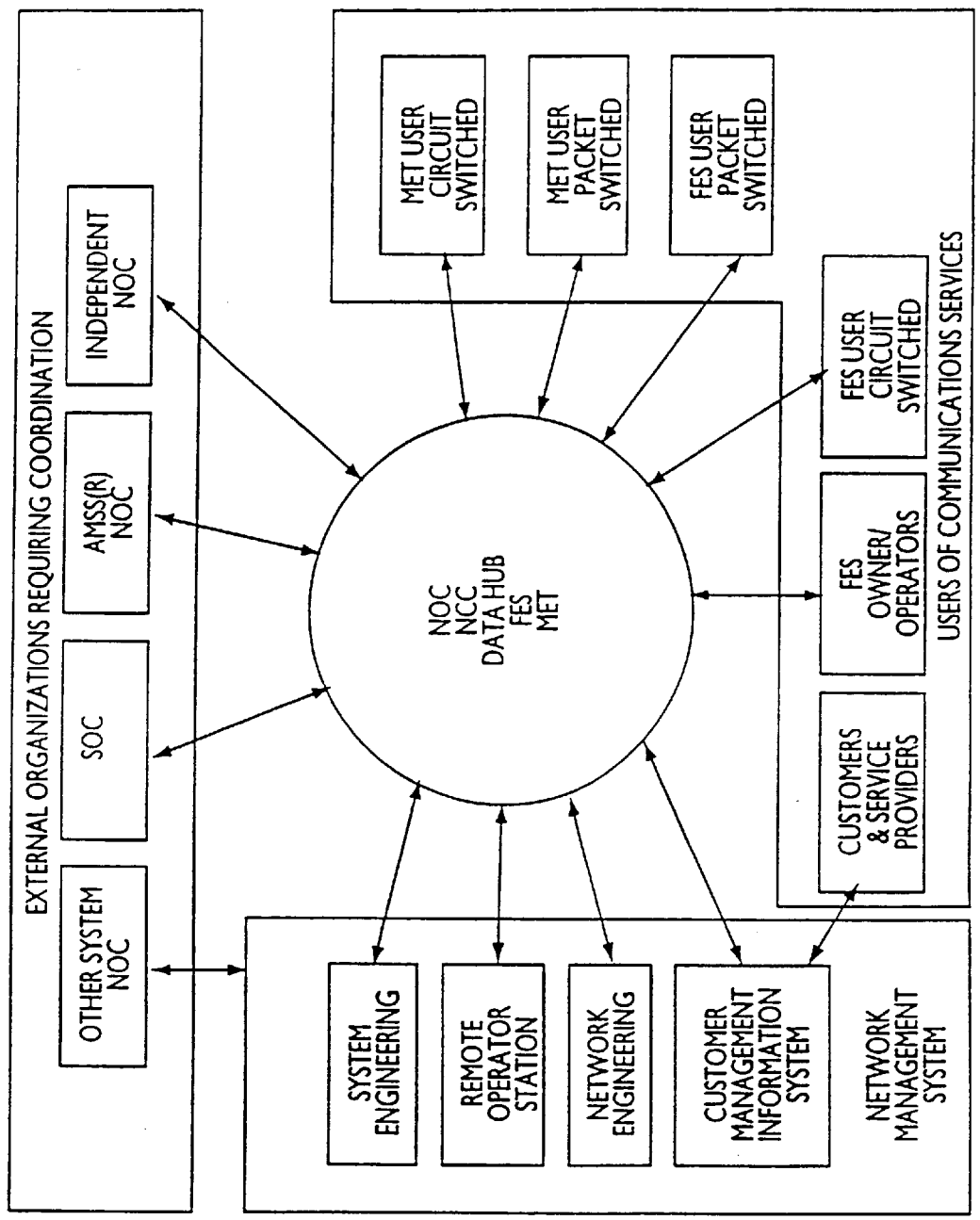
FIG. 3 is a diagram of the satellite network system illustrating components and respective interfaces.
Figure 4:
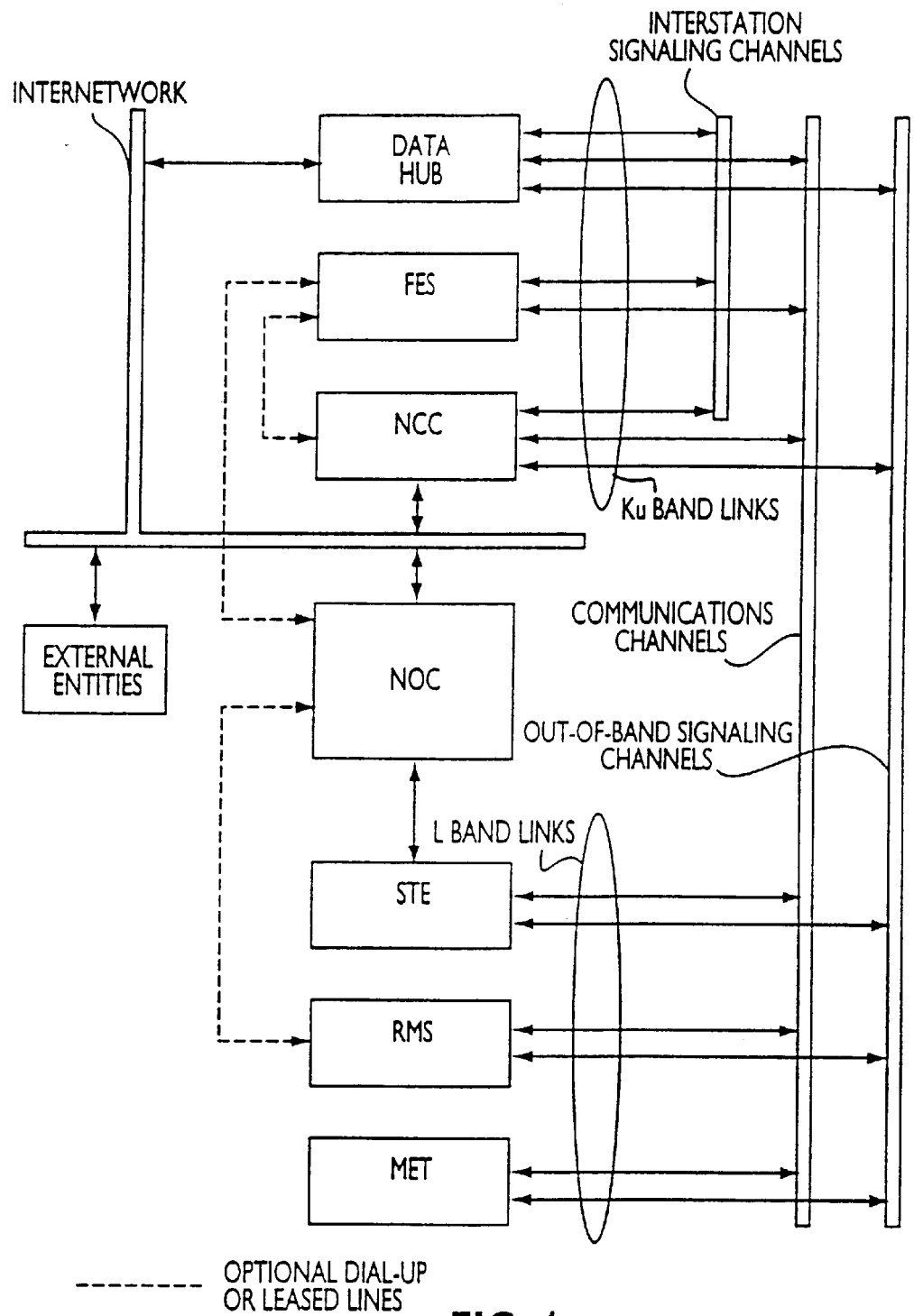
FIG. 4 is a diagram of a satellite network system illustrating a number of system elements and their interconnecting communications links.
Figure 5:
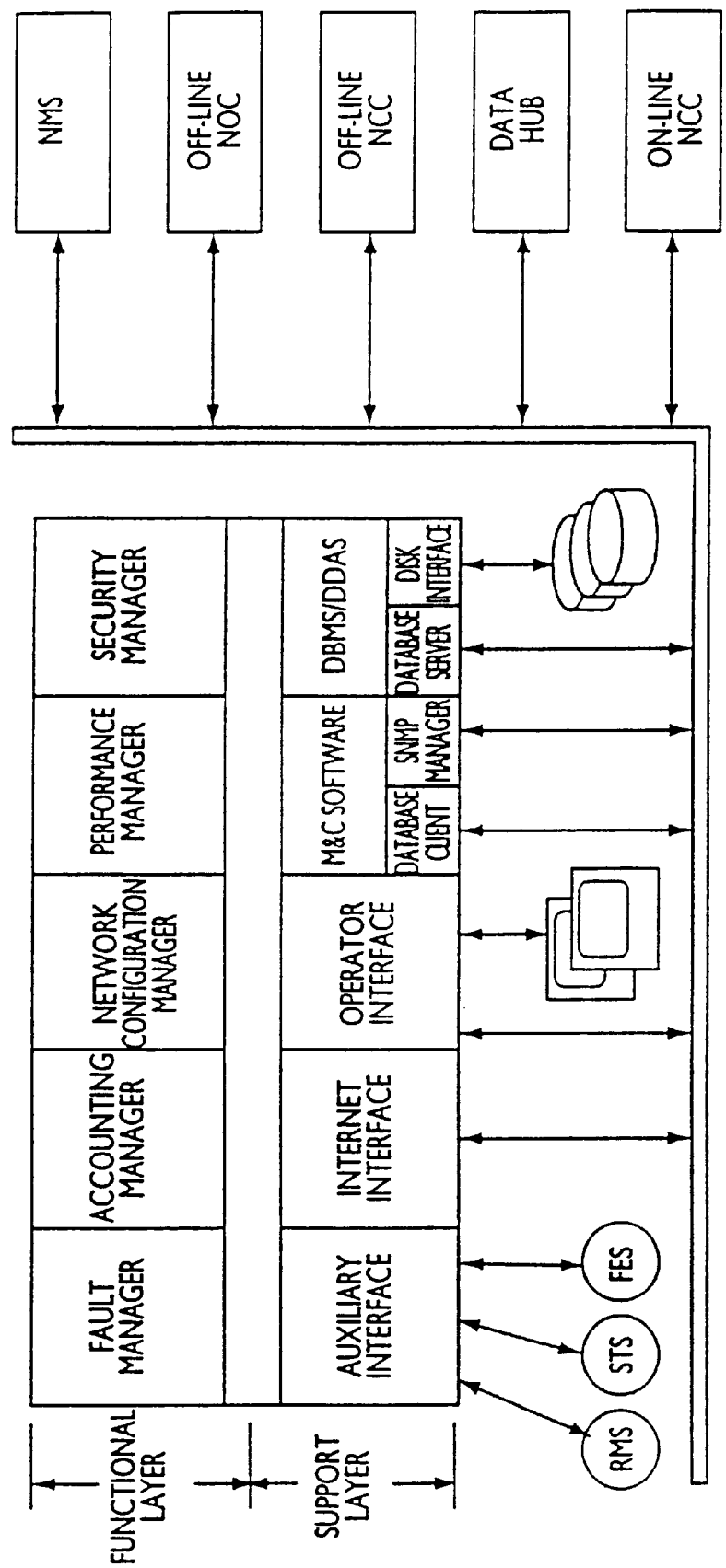
FIG. 5 is a basic block diagram of the NOC and its interfaces.
Figure 6:
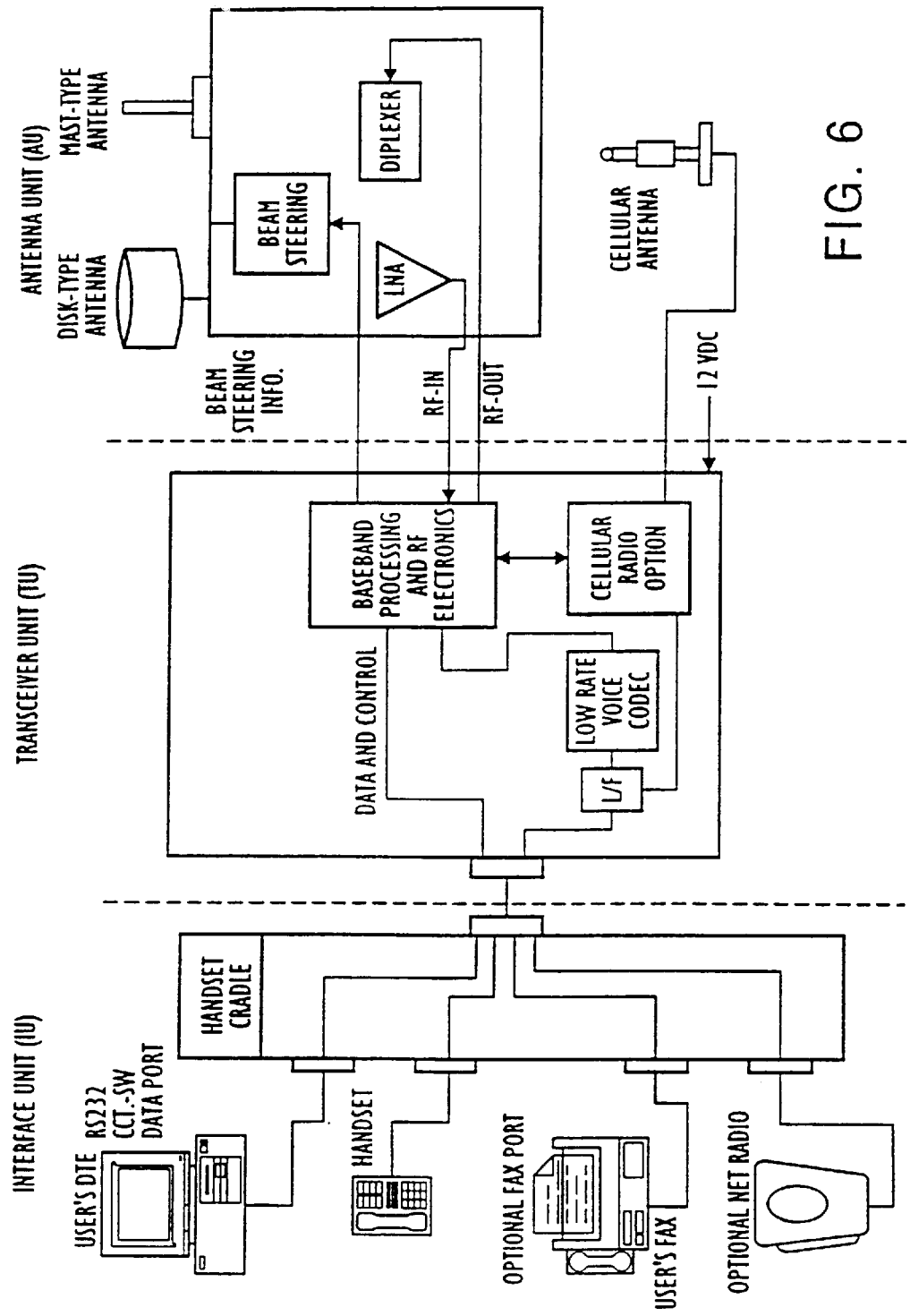
FIG. 6 is a basic block diagram of the physical architecture of the mobile earth terminal.
Figure 7:
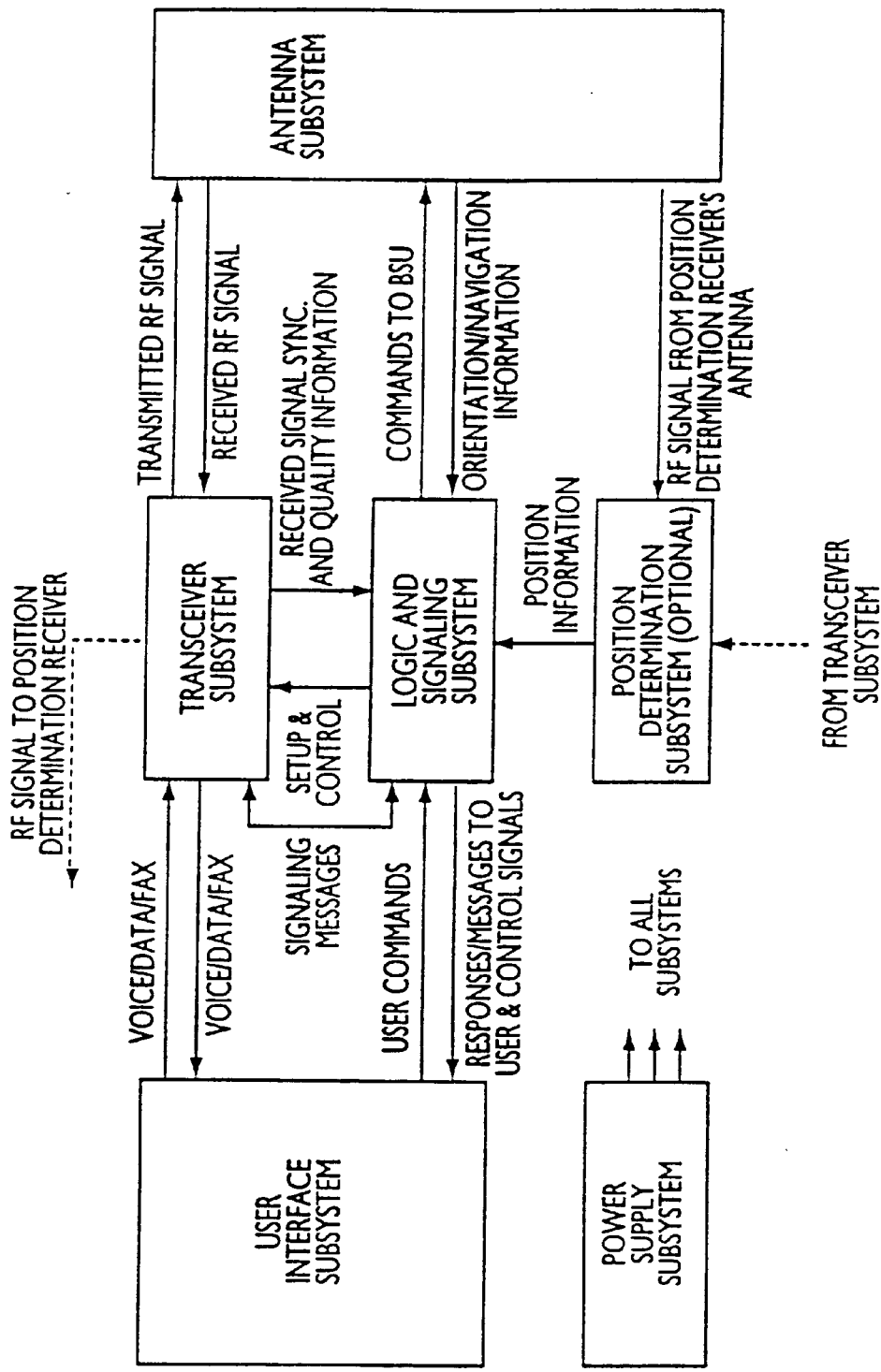
FIG. 7 is a basic block diagram of the functions of the mobile earth terminal.

The MET includes all of the communication and control functions necessary to support communications from a vehicle or fixed remote site using the resources of the satellite network system. FIGS. 6 and 7 are basic block diagrams of the physical architecture and functions of the mobile earth terminal. The basic functional diagram of FIG. 7 is implemented by baseband processing and RF electronics of FIG. 6. A standard voice coder/decoder receives coded messages from the baseband processing and RF electronic system and decodes the message received from the satellite antenna unit for delivery to the interface unit that includes standard user interfaces. Baseband processing and RF electronics receive satellite communications responsive with low noise amplifier (LNA) and output signals for transmission using the diplexer of the antenna unit. Baseband processing and RF electronics also outputs signals for use with beam steering antennas as will be discussed blow. Advantageously, the mobile earth terminal is functional with antennas that are either steerable or nonsteerable.

The functional subsystems comprising the MET are shown in FIG. 7 and include the user interface, transceiver, antenna, logic and signaling, power supply subsystems, and Position Determination subsystem. The baseline MET will have a low gain directional antenna in the antenna subsystem. The satellite network system supports communications with METs using omnidirectional and higher gain directional antennas.

The user interface subsystem provides the user interfaces through which the user has access to the services supported by the satellite network system. Depending on the service(s) the MET will be equipped with one or more of the devices or ports. The transceiver subsystem consists of a receiver and a transmitter. The transmitter accepts voice, data, fax and signaling signals and converts them to a modulated RF signal. The transmit RF signal is routed to the antenna subsystem. The transmitter typically consists of the high power amplifier (HPA), the upconverter with its associated frequency synthesizer, the modulators and the modules for voice, Fax, or data encoding, multiplexing, scrambling, FEC encoding, interleaving and frame formatting.

The receiver accepts modulated RF signals from the antenna subsystem and converts them into voice, data, fax or signaling signals as appropriate. The voice, data and fax signals are routed to the user interface subsystem. The receiver typically consists of the downconverter with its associated frequency synthesizer, the demodulator, and the modules for frame de-formatting, de-interleaving, FEC decoding, descrambling, demultiplexing and voice, Fax, or data decoding. The transceiver communicates over one channel in each direction at any one time. Thus, the transceiver subsystem will typically consist of only one receiver and one transmitter. However, the MET may also incorporate a pilot receiver for antennas and frequency tracking purposes, or a complete receiver dedicated to the continuous reception of the signaling channel from the Group Controller.

The antenna subsystem provides the MET interface to the satellite network and is responsible for receiving the RF signal from the satellite and transmitting the RF signal generated by the MET towards the satellite. The subsystem typically includes an antenna which may be either directional or omnidirectional, a diplexer, a low noise amplifier (LNA), an optional beam steering unit (BSU) if a directional antenna is used, a device such as a compass or an inertial sensor for the determination of the orientation of the vehicle, and an antenna for the position determination receiver.

The logic and signaling subsystem acts as the central controller for the MET. Its basic functions are to initialize the MET by performing a self test at power up and control, based on a resident system table, the acquisition of one of the METs assigned outbound signaling channels from which updated system information and commands and messages from the GC are derived. The logic and signaling subsystem sets up and configures the transceiver for the reception and transmission of voice, data, fax or signaling messages as appropriate. The logic and signaling subsystem also handles the protocols between the MET and the FES and between the MET the GC via signaling messages, and checks the validity of the received signaling messages (Cyclic Redundance Check (CRC)) and generates the CRC codes for the signaling message transmitted by the MET.

The logic and signaling subsystem also interprets the commands received from the local user via the user interface subsystem (e.g. on/off hook, dialled numbers, etc.) and take the appropriate actions needed, and generates, or commands the generation, of control signals, messages and indications to the user through the user interface subsystem. The logic signaling system also controls the beam steering unit (if any) in the antenna subsystem, and monitors and tests all the other subsystems. In case of fault detection, it informs the user about the failure and take the appropriate measures needed to prevent harmful interference to the satellite network or other systems.

The power supply subsystem provides power to all other subsystems. The external voltage source to which this subsystem interfaces depends on the type of vehicle on which the MET is mounted (e.g. 12/24 Volts DC for land vehicles).

A standard receiver such as a GPS or a Loran-C receiver is also provided for the determination of the position of the vehicle. This information is used by the logic and signaling subsystem for beam steering (if used) or for applications such as position reporting. The position determination system is implemented externally to the MET and interfaced through a dedicated data port in the user interface subsystem.

The function of the Remote Monitor System is to continuously monitor the activity on each GC-S channel and to monitor the activity within the downlink L-band spectrum in the beam in which it is located. An RMS will be located in every beam carrying satellite network traffic. An RMS may be a stand alone station or collocated with the NCC or an FES. The RMS is controlled by the NOC and communicates via leased lines or the interstation signaling channels if collocated with an FES. The RMS detects anomalous conditions such as loss of signal, loss of frame sync, excessive BER, etc. on the GC-S channels and generates alarm reports which are transmitted to the NOC via the leased line interface. In addition, it monitors BER on any channel and power and frequency in any band as instructed by the NOC.

The primary functions of the System Test Stations (STS) is to provide commission testing capability for every channel unit in a FES and to provide readiness testing for the Off-Line NCC. The STS is collocated with and controlled by the NOC and will comprise one or more specifically instrumented METs. The STS provides a PSTN dial-up port for making terrestrial connections to FESs to perform MET to terrestrial end-to-end testing. The STS also provides a LAN interconnection to the NOC to provide access to operator consoles and peripheral equipment.

Advantageously, the MET combines three different features for the delivery and transmission of voice and data. These three features include: the ability to initiate and transmit a data call, the ability to initiate and transmit a facsimile digital call, and the ability to roam between satellite and terrestrial based wireless communication systems. The following documents, representing applicable transmission protocols, are hereby incorporated by reference: EIA/IS-41B Cellular Radio Telecommunications Inter-System Operations; EIA/TIA-553-1989 "Cellular System Mobile Station—Land Station Compatibility Standard"; EIA/TIA-557; EIA/IS-54B. A more detailed description of the MET is also provided in U.S. provisional patent application serial No. 60/002,374 filed on Aug. 15, 1995 to Ward et al., entitled "Improved Mobile Earth Terminal" incorporated herein by reference.

Some MSS system users have voice communication requirements that are not met by MTS and Mobile Radio Service (MRS). They need to communicate in a Closed User Group (CUG) arrangement that allows each member of the group to hear what any other user is saying. Each member of the group can also talk when needed. The system behaves like a radio multi-party line. Public services and law enforcement agencies are typical users of this service, which is normally provided by either traditional terrestrial radio networks or by the more recent trunked radio systems. These trunked systems, generally in the 800–900 MHz band, provide groups of end users with virtual private systems by assigning frequencies to CUGs on a demand basis. The Net Radio service is meant to be the satellite equivalent of terrestrial trunked systems ("trunking" for short), and could be pictured as a "Satellite Trunked Radio Service", or "Satellite Trunking".

The Net Radio service provides the capability described in the previous paragraph in a cost effective manner:

- as one shared satellite demand period circuit per CUG is utilized rather than one circuit per mobile user, the cost per minute of a group conversation would be much less expensive to the owner of the group, and
- as the call set-up time for one shared circuit per CUG compared to an MRS multi-user conference set-up time is likely to be more acceptable to a group end user/operator, who normally expects to be able to talk as soon as the handset/microphone is taken off-hook.

Figure 8:
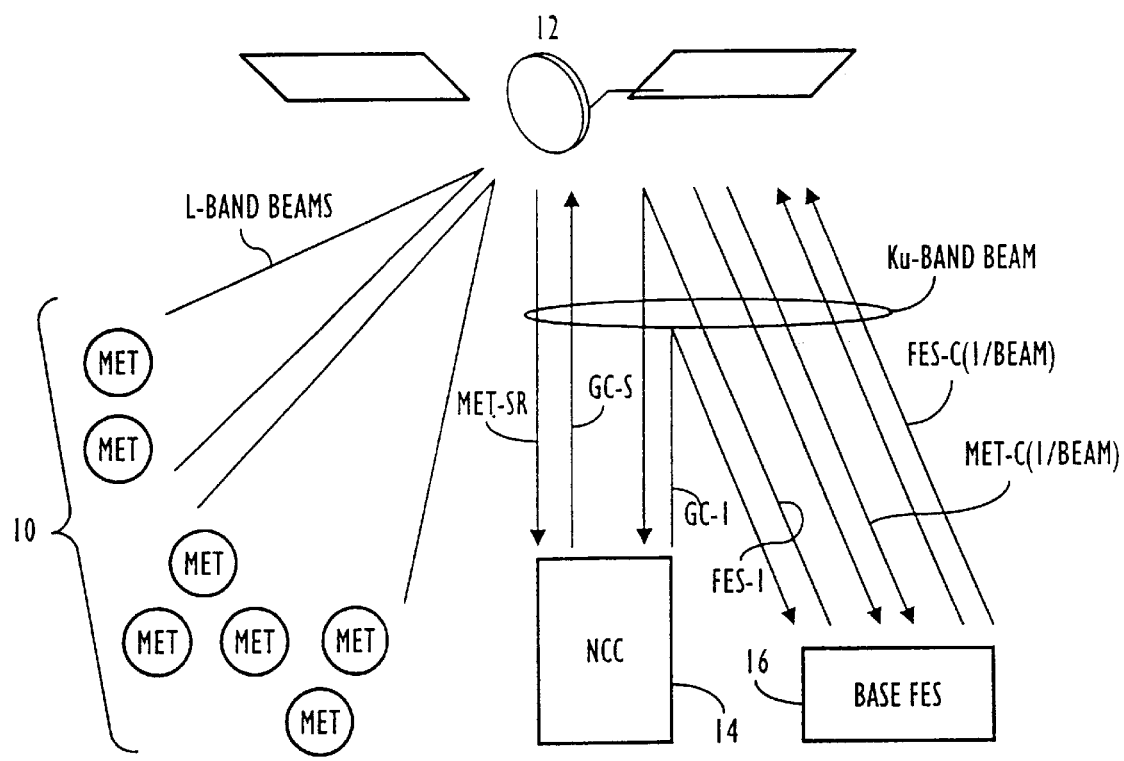
FIG. 8 illustrates the basic concept and elements involved in establishment of communications and control in the Net Radio system.

An overview of the MSS system with Net Radio service is illustrated in FIG. 8. FIG. 8 illustrates the basic concept and elements involved in establishment of communications and control in the Net Radio system. METs access the system via one or more L-band beams. Each beam contains one or more signaling channels for network control and call establishment and a number of communications channels for provision of Net Radio services to METs.

The L-band frequencies are translated to Ku-band frequencies by the satellite 12. The Network Control Center 14 is responsible for the real time allocation of channels to support Net Radio calls. The base Feederlink Earth Station 16 is responsible for re-transmission on the outbound channel of the MET transmissions received on the inbound channel, control of the Net Radio call, and interfacing the Net Radio call to terrestrial private networks.

Net Radio service is available to CUGs on subscription to MSS. A subscribing organization may comprise a number of METs grouped by their communication needs. A virtual private communication net is established for each of these groups or subgroups.

Figure 9:
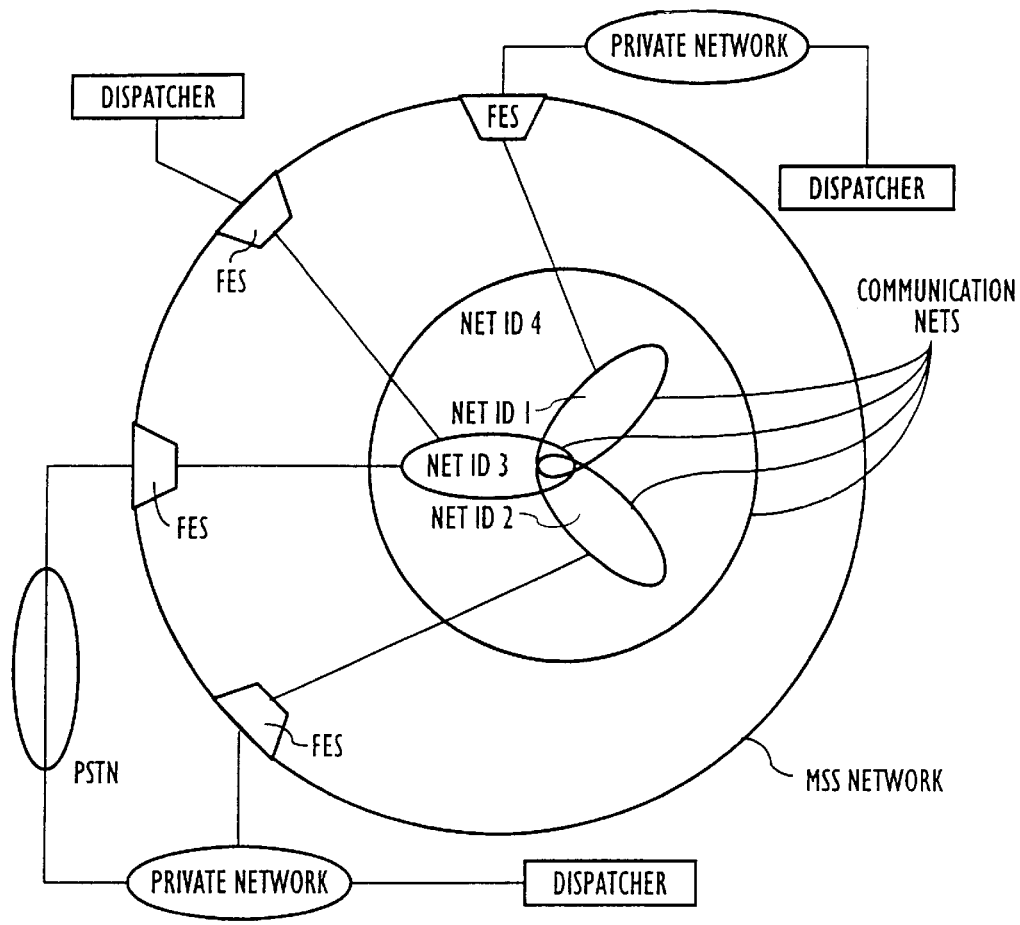
FIG. 9 is a diagram of an example of a Net Radio service subscribing organization with several communication nets.

The base FES 16 can interconnect the Net Radio call to terrestrial private networks so that a dispatcher located within the private network can participate in the conversation. A Dispatch facility may be directly connected to the base FES 16, or may use leased PSTN or dial-up access, or may use a Mobile Radio Service (MRSA) circuit. An example of a Net Radio service subscribing organization with several communication nets is depicted in FIG. 9.

The Net Radio MET operates in CUG and receives voice transmissions from all other MET users in the same CUG, and the base FES. The MET supports Net Radio service on a single demand period circuit per beam, which is shared by the entire CUG. The MET requiring communications will be given the Net ID for the net and since different nets may be necessary for different purposes, the MET may be given a number of different NET IDs. NET IDs may represent organizational groups such as fleets or sub-fleets. NET IDs may represent functional groups such as a command unit which draws on mobile users from more than one fleet or sub-fleet. NET IDs may represent geographic configurations such as an east or west area, or both.

A mobile user requests a channel on a Push-To-Talk (PTT) basis. The MET receives an assignment of demand period satellite resources consisting of an outbound channel frequency and an inbound channel frequency relevant to the particular NET ID (per defined CUG beam). The mobile user is alerted by a tone when the channel is available and the base FES manages the contention on the communications channel. Since the base FES retransmits the signal received from the mobile, the MET operates in a half duplex PTT mode, turning off the speaker while the microphone is engaged. When the user releases the PTT, the MET ceases transmission. On receipt of a release message from the base FES, the MET retunes to the signaling channel.

Figure 10A:
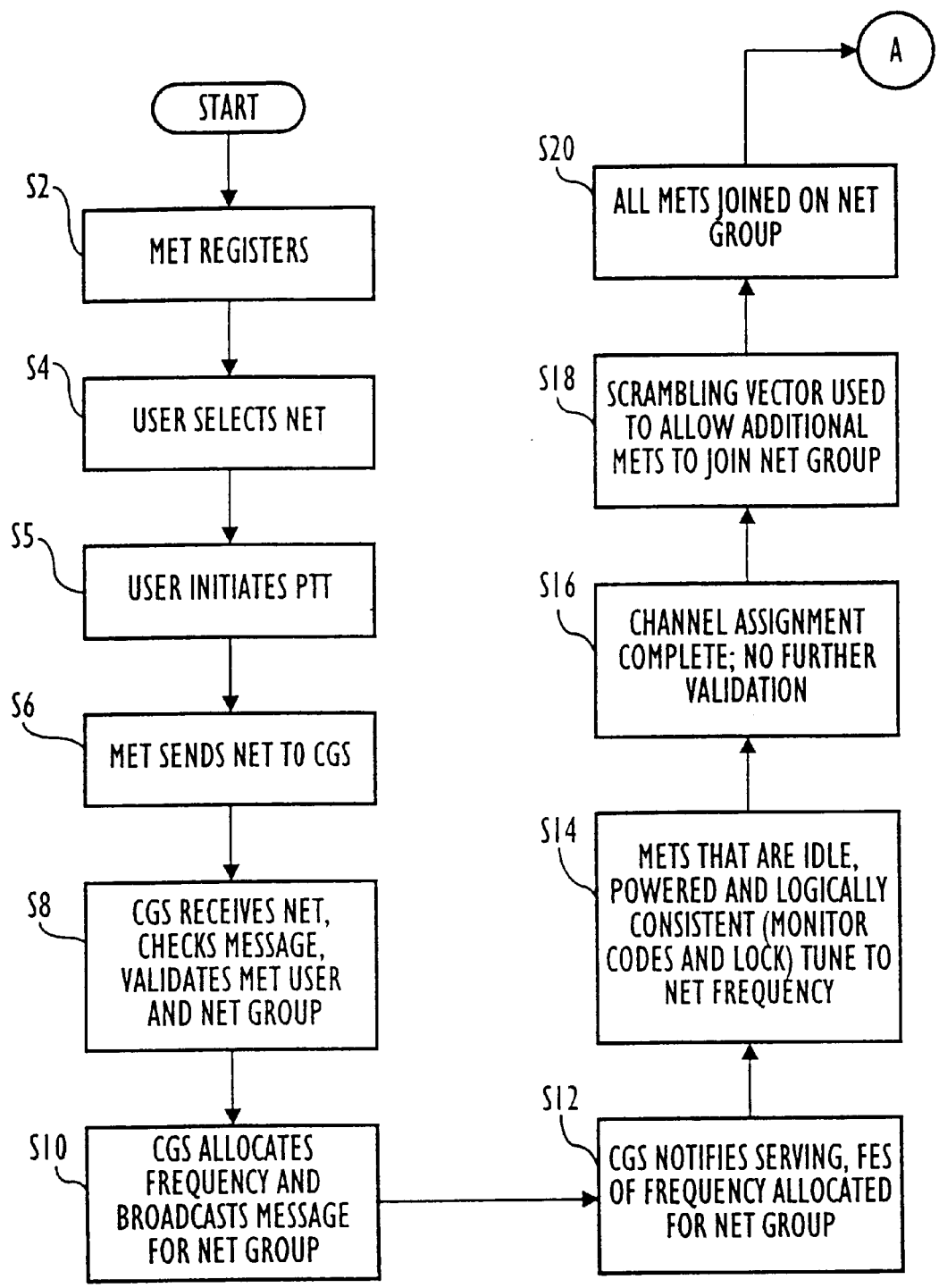
FIGS. 10A-10C are flowcharts of the overall process conducted by the various components in establishment of communications and control in the Net Radio system.
Figure 10B:
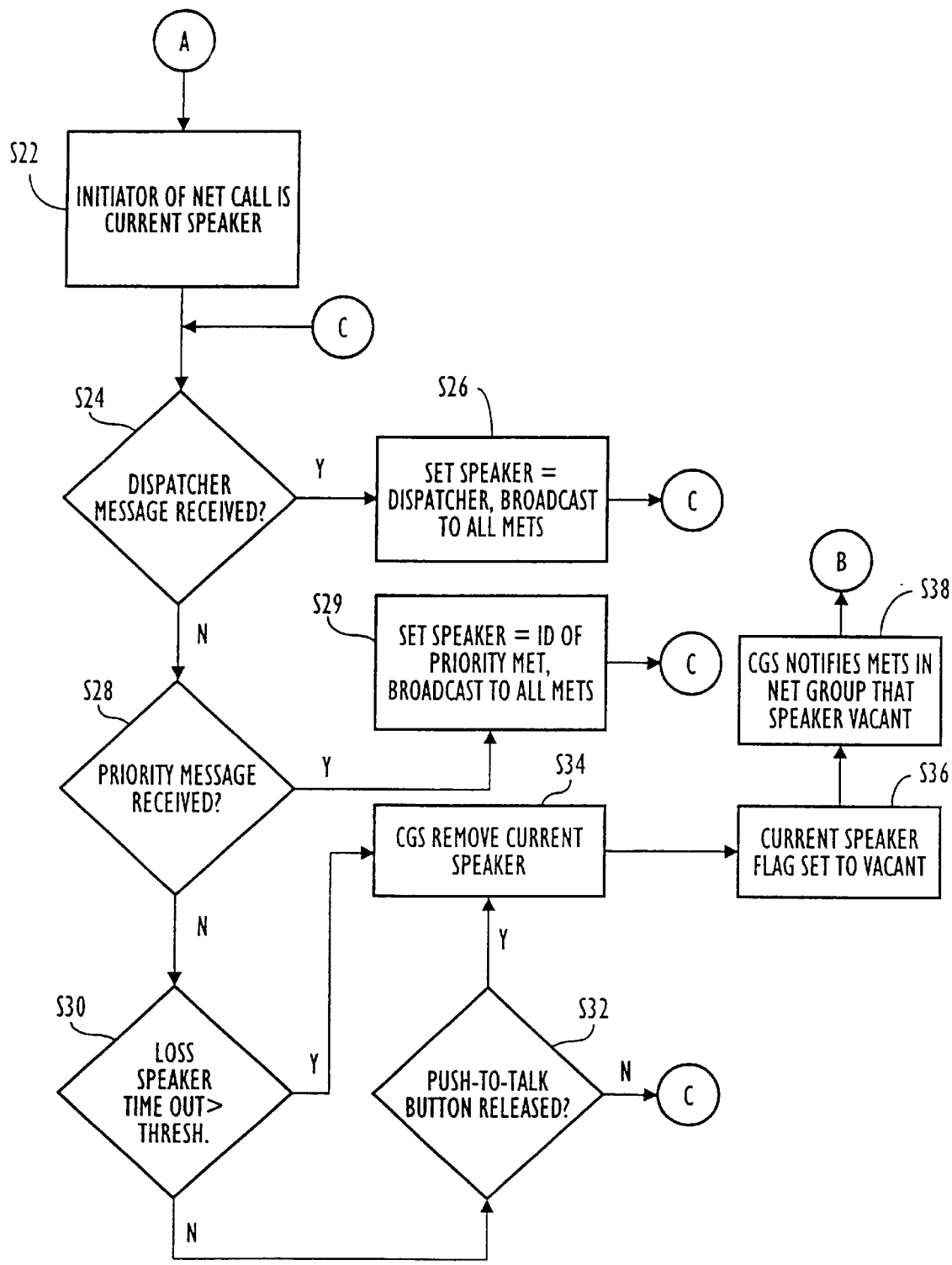
Figure 10C:
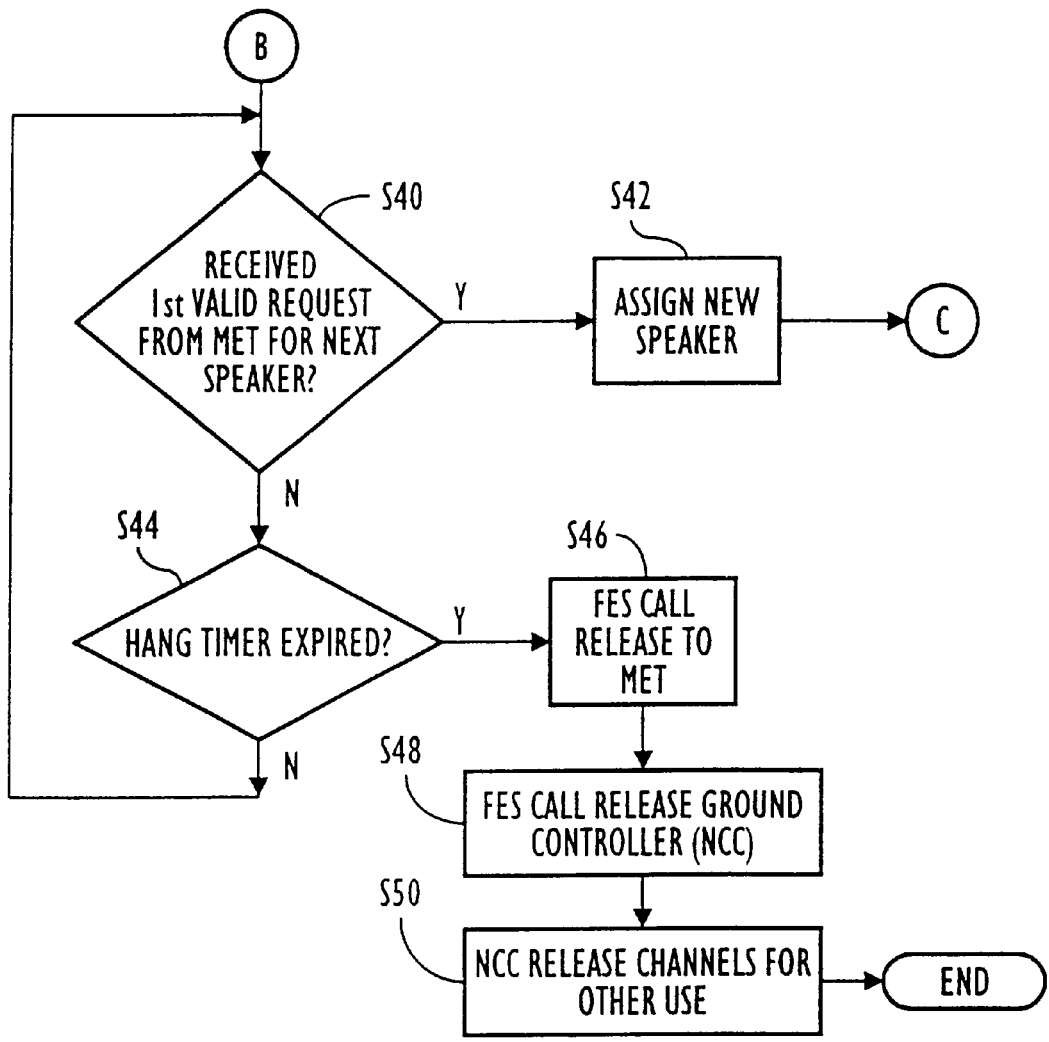

FIGS. 10A-10C are flowcharts of the overall process conducted by the various components in establishment of communications and control in the Net Radio system. In FIGS. 10A-10C, a mobile earth terminal registers in step S2 and the user of the mobile earth terminal selects a particular net to establish voice communication therewith in step S4. The user then activates the push-to-talk (PTT) button of the MET in step S5.

In step S6, the MET sends the net number to the communication ground segment. The communications ground segment receives the net number, checks the message for transmission errors, validates the specific MET user and also validates the requested net group in step S8. The communications ground segment allocates a specific frequency for the net group and broadcasts the message to the net group informing the net group of the allocated frequency in step S10.

The group controller in the communications ground segment will also send the net frequency to the feeder link earth station in step S12. In step S14, the METs that are idle, powered and logically consistent with respect to monitor codes and lock discussed below, will tune to the net frequency indicated by the communication ground segment. Channel assignment is thereupon completed and no further validation for the net group is performed in step S16. A scrambling vector is next used to permit additional METs to join the selected net group in step S18. All METs are assumed to have joined the net group in step S20. CGS will continue to broadcast NET group activation information at predetermined time intervals while the NET group is active.

The MET user which initiates the Net Radio call is considered to be the current speaker in step S22 permitting the initiator to communicate with the various MET users that have joined the net group. The MET monitors whether a dispatcher message has been received in step S24, and if so the current speaker is set to the dispatcher, and the communication is broadcast to all METs in the NET group in step S26. The MET also monitors receipt of the priority message in step S28, and if a priority message is received, sets the current speaker to the identifier of the priority MET, and the communication is broadcast to all METs in the NET group in step S29.

If no dispatcher message or priority message is received, the MET also monitors whether the current speaker is active in step S30. If speaker is active for the requisite period of time, the MET also determines whether the push-to-talk button has been released in step S32. If either the speaker is inactive for greater than a predetermined threshold period of time as determined in S30 or the push-to-talk button has been released as determined in step S32, the current speaker is removed by the communications ground segment in step S34, and the current speaker is set to vacant in step S36. The communication ground segment will then notify the METs in the net group that the speaker is vacant in step S38.

The METs will then be permitted to initiate a request to be the next current speaker. Upon receipt of the first valid request from a MET to be the next speaker in step S40, the communications ground segment will assign the new speaker to that particular MET in step S42. If, however, no request from a MET is made to be the next speaker, the communications ground segment will determine whether or not the hang timer has expired in step S44. If the hang timer has expired, the communications ground segment will release the call to the METs of the net group in step S46. The feeder link earth station will also initiate a call release to the ground controller in step S48 and the ground controller will release the frequency channel which was being used for the net group in step S50.

The MET supports the service categories for Net Radio listed in FIG. 11. MSS will support addressing methods that permit private communications between a mobile end-user and groups or sub-groups of end users, or an individual, where the individual is part of the same group. NET IDs are utilized, where a NET ID can represent either a group, sub-group or individual. MSS supports addressing methods that permit a mobile end user to engage in a private conversation with another mobile where the called mobile is part of the same virtual network as the calling mobile.

It should be noted that even on private mobile to mobile calls the PTT has to be used, as the two mobile units share the same satellite circuit. This is the main difference between MRS and Net Radio for mobile to mobile calls. The MET monitors the NET Radio Channel Assignment SUs (NRCHA_SU)s on the GC-S channel for those containing any of its stored NET IDs and, if not engaged in a Priority call or set-up procedure, responds to assignments in accordance with the current setting of the call monitoring.

The MET provides a User ID display for the purpose of displaying the NET ID the MET is currently tuned to, and the MET DN of the current speaker. The MET optionally displays an alpha-numeric display or user programmable label associated with a NET ID. When suitably equipped with a second receiver capable of continuously receiving the GC-S channel, the MET provides the user with notification of incoming calls, which the user may accept or reject.

This section provides the formats of several SUs used by the MET that are additional for Net Radio service. A separate section is generally provided for each channel type (GC-S, MET-SR, FES-C, MET-C).

GC-S Messages

The SUs transmitted on the GC-S signaling channel that are additional for Net Radio shall conform to the content and format specified in this section. The messages are required for Network Management and Call Control. FIG. 12 identifies the additional GC-S messages in each group.

1. The NID_SU is transmitted by the NCC to a MET on the GC-S channel. The NID_SU is used to download a NET ID assignment to a MET subscribing to Net Radio Service.

2. The NID_SU has the format illustrated in FIG. 13. The content of the NID-SU conforms to FIG. 14.

NET ID Attribute (NA)

The NA message is used to allocate and de-allocate NET IDs assigned to a MET, to change a METs Directory Number (DN), or to change the user defined characteristics of a NET ID assigned to a MET. The NA_SU has the format illustrated in FIG. 15. The content of the NA-SU conforms to FIG. 16.

Net Radio Channel Assignment (NRCHA)

The NRCHA message is used by the GC to broadcast the channel assignments to the METs for a Net Radio call. The SU is broadcast on all GC-S channels defined for the NET ID. The NRCHA_SU has the format illustrated in FIG. 17. The content of the NRCHA_SU conforms to FIG. 18. This message is rebroadcast on the GC-S channel every predetermined time interval (e.g., every 10 seconds) for the duration of activity of the NET communication.

MET-SR and MET-ST Messages

The SUs transmitted on the MET-SR and MET-ST signaling channel that are additional for Net Radio conform to the content and format specified in this section. The MET-SR messages are of the Call Control category. The MET-ST messages are of the Network Management Category. FIG. 19 identifies the messages.

MET Management Acknowledge (MMA)

The MMA_SU is used by METs to acknowledge NID and NA messages received from the GC. The MMA_SU has the format illustrated in FIG. 20. The content of the MMA_SU conforms to FIG. 21.

Net Radio Access Request (NRACR)

The NRACR_SU shall be used by METs to initiate Net Radio calls. The SU message has the format illustrated in FIG. 22. The content of the NRACR_SU conforms to FIG. 23.

FES-C Messages

The SUs transmitted on the FES-C signaling channel that are additional for Net Radio conform to the content and format specified in this section. The messages are of the Call Control category. FIG. 24 identifies the messages in each group.

Net Radio Call Release (NRCR)

The NRCR_SU shall be used to broadcast the NET ID to the METs during a Net Radio call and to indicate to the METs that the channel assignment for the Net Radio call is about to be released. The NRCR_SU has similar format and content as described above.

MET-C Messages

The SUs transmitted on the MET-C signaling channel that are additional for Net Radio conform to the content and format specified in this section. The messages are of the Call Control category.

Push-To-Talk (PTT)

The PTT_SU is used to request access to the inbound channel for a Net Radio call. The PTT_SU has the content conformed to FIG. 25. The Response SU shall be used by the MET to respond to FES-C Command SUs received on the FES-C channel. The Response SU shall have the same format and contents as specified for the FES-C Command SU. The Reserved field is reserved for future user defined requirements. The MET timing requirements for Net Radio service are illustrated in FIG. 26.

Push-to-Talk Operation

In the NET Radio service the operation of the PTT resembles terrestrial trunked radio systems. A PTT microphone/handset or the like is needed for Net Radio. Depressing the PTT, switch when the-current NET is unassigned shall result in the transmission of a NRACR_SU with the intent of requesting the assignment of a channel to the selected NET ID, subject to the availability of resources. Depressing the PTT switch while the selected NET ID is active and the speaker ID is vacant shall result in the transmission of a PTT_SU request on the communications channel followed by the transmission of voice frames in accordance with the standard MET call supervision procedures. If the MET has not selected a NET ID and the MET is not active in a NET Radio Call, then the MET ignores the PTT request.

Depressing of the PTT results in transmission of a PTT_SU only if the PTT is pressed after the speaker ID is equal to the vacant code or the METs DN. This will relieve congestion on the MET-C channel by adding a natural delay. If the MET user depresses the PTT before the speaker ID is vacant or matches the METs DN, the MET ignores the request.

Priority 1 service is granted to a MET, not based on the PTT, but only by activation of the Priority 1 Button. Activation of the Priority 1 Button shall result in a Priority 1 call. The user is given immediate access to the channel and retains it until he releases his PTT, is preempted by another Priority request generated by another MET user, or is preempted by a dispatcher PTT. If he wishes to make another Priority 1 transmission it shall be necessary to repeat the procedure.

The re-transmitted signal appears to the MET user as a delayed echo where the delay time is the double satellite link transmission delay time. For this reason, the speaker is disabled while the user is talking. The MET operates in half duplex from the user's viewpoint, but operates in full duplex over the satellite channels.

MSS Network Management assigns each communication net a Net Radio Identification (NET ID) number when the subscribing organization defines the net. A MET is also assigned a number of NET IDs to use. The MET stores in non-volatile RAM a GSI code for Net Radio service. The MET uses this GSI in selecting a GC-S channel while providing Net Radio service. The MET also stores a directory number (DN) with a maximum of 4 digits. The MET DN is downloaded to the MET at the completion of the commissioning process. If the MET receives an NA_SU with operator field equal to 3, the MET stores the specified DN as its new DN.

The MSS Network Management assigns a unique 16 bit access security code to each NET ID defined. The MET uses the NET access security code (NET ID ASK) to determine a standard scrambling vector used to initialize the channel unit scrambler for transmit and receive Net Radio calls. The MET determines the scrambling vector using as input:

the NET ID Access Security Key (ASK)
the transmit Frequency Assignment
the Receive Frequency Assignment.

A Net Radio subscriber can customize the organization of communications nets. User defined NET ID attributes, a NET ID Tag number, and a Monitor code, are associated with the NET ID for this purpose. The Tag number is used to designate a selector position, or memory location to "tag" the NET ID to. When the MET operator sets the selector switch to a position, the MET uses the NET ID with the Tag number that corresponds to the selector position. This permits a CUG to setup all METs with the same selection positions for emergency nets for example.

The monitor codes are identified in FIG. 27 and are used to control which channel assignments the MET responds to. During a lull in the conversation where the hangtimer has expired (described below), the MET receives a channel assignment to a NET ID other than the one that was just tuned to. If the MET tunes to the new net, the operator may miss the next conversation on the previous net. At the same time, the monitor code permits the organization to setup nets which can reach entire fleets, or emergency teams even though all member METs have not selected that NET ID. In this case a monitor code for a required response is associated with the NET ID.

A Net Management System (NMS) permits a Net Radio subscribing organization to customize their communication nets by assigning NET IDs to METs, changing NET ID assignments, or modifying the user defined attributes of a NET ID assigned to a MET. These changes are made by contacting or interfacing with customer billing support system/personnel. The NMS enters the changes in the NOC customer configuration database. The NOC disseminates this information to the NCC, which downloads the changes to the MET "over the air" from the GC-S channel.

The MET uses acknowledged MGSP message pairs for Net Radio MET management. Upon receipt of a NID SU addressed to it, the MET de-encrypts the NET ID NRASK using the METs ASK and RTIN, and stores that NET ID and the NRASK associated with the NET ID in non-volatile memory. The MET then sends the MMA SU to the GC. The MET stores multiple NET IDs, and an ASK is stored with each NET ID.

Upon receipt of the NET ID Attribute SU, the MET performs operations indicated in the SU. The MET sends the MMA SU to the GC. The MET examines the Tag number contained in the NET ID Attribute SU (NA_SU) and, provided the Operator field equals a predetermined number, uses this number to determine the Tag position of the NET ID Selector switch to associate with that particular NET ID. For example, for a Tag number of zero the MET stores the NET ID in Tag location 00, which is reserved for Private Mode. If the Operator field in the NA_SU equals a predetermined number, for example 1, the MET erases the specified NET ID from memory.

The MET supports the following responses to the Monitor codes contained in the NA_SU. The MET provides a means for the user to select one of the NET IDs and "lock-on" to it. When so selected, the MET does not respond to the NET ID assignments with monitor code 00 or 01, but responds to assignments with 11 code.

The sequence of information exchanged between the MET, GC, and FES is for the purpose of demand period circuit assignment for Net Radio service, Private Mode service, Priority 1 service and Broadcast service calls. A call is described in five parts; channel assignment, call establishment, call monitoring, call supervision and call release. Channel assignment includes the network access procedures. Call establishment includes the procedures followed by the FES and the MET to initiate a Net Radio call. Call monitoring includes the procedures performed by the MET during a call. Call supervision includes procedures, performed by the FES, which provide contention resolution for MET access to the inbound channel. Call release includes those procedures used by the FES to terminate a call and release the demand period circuits.

METs place and accept voice calls to/from members of the closed user group and a private network connected at a base FES. The GC controls access to the satellite resources. The base FES provides the Net Radio function of re-transmitting the mobile transmissions so that all member METs participating in the call can hear both sides of the conversation. The FES provides access to the private network.

Figure 28:
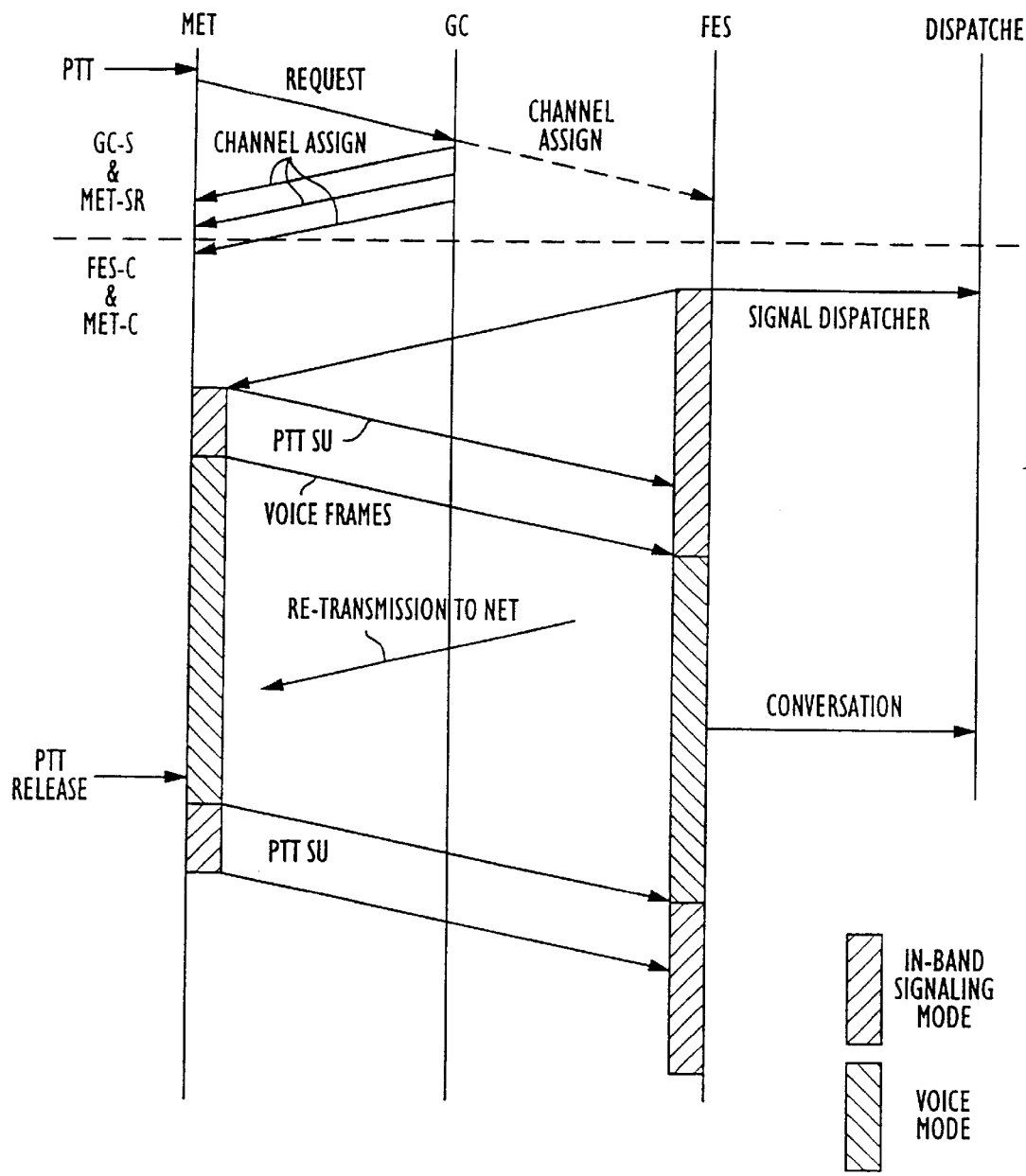
FIG. 28 is an illustration of a MET originated net radio call message flow.
Figure 29:
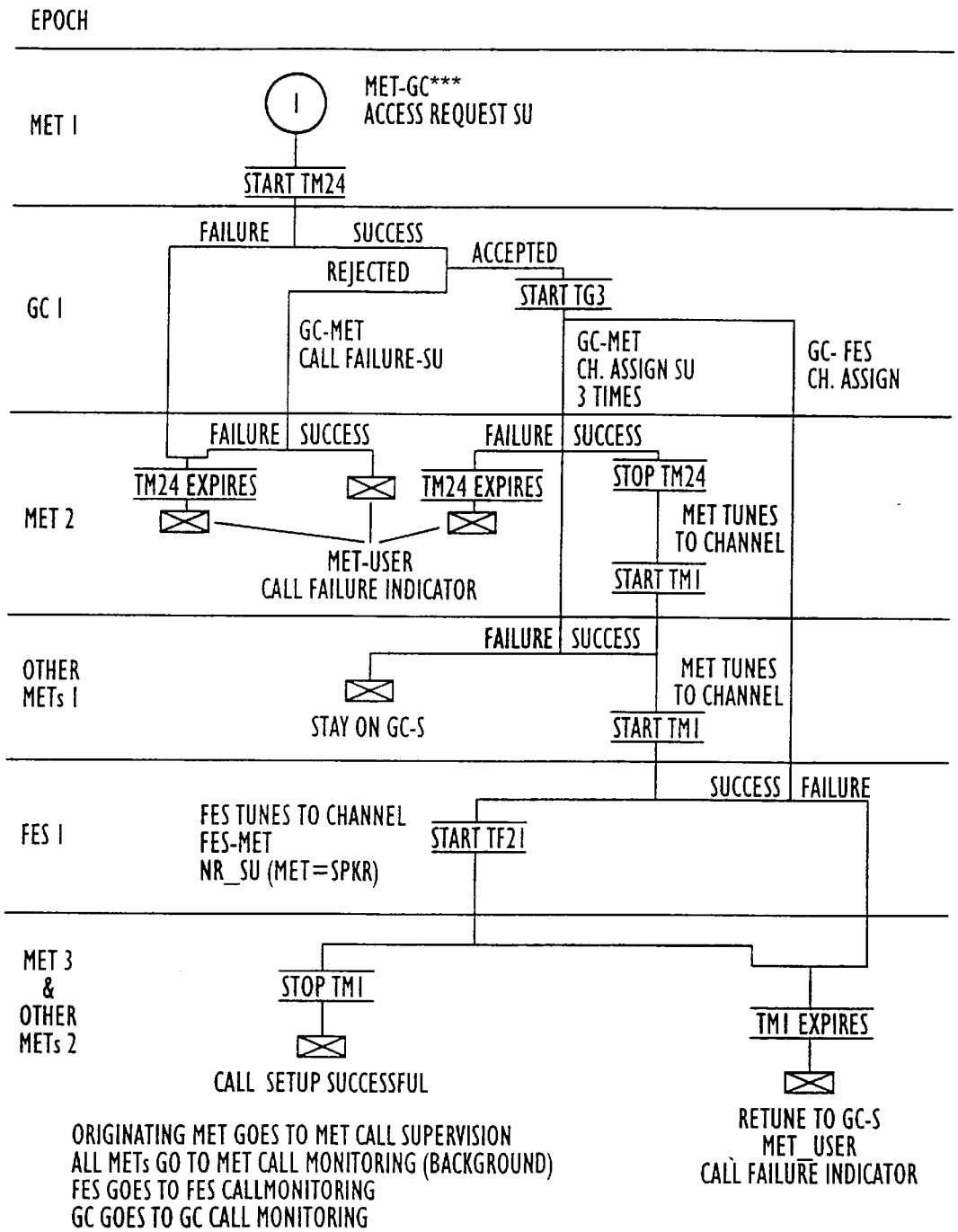
FIG. 29 is an illustration of a MET originated Net Radio call setup event tree.

MET originated Net Radio calls are established using the sequence of messages shown in FIG. 28. The protocol employed is as specified in the event tree in FIG. 29. Upon receiving a NRACR-SU, the GC verifies, based on the requesting MET RTIN that:

the MET is an operational Net Radio user;
the MET is authorized to originate a Net Radio call using the NET ID included in the NRACR_SU;
the required satellite capacity is available;
the call type in the NET ID data base file is for Net Radio service.

The GC verifies that the MET which requested the Net Radio call is in a beam included for the NET ID. If for any reason the call cannot be completed the GC sends a Call Failure SU using MGSP to the mobile terminal with the cause of failure indicated in the cause indication parameter.

Once the GC determines that the call can be completed it will select frequency assignments for a FES-C communication channel and a MET-C communication channel and format a NRCHA SU with the NET ID for the call, and the call type set to Net Radio service. The FES begins transmitting Net Radio SUs (NR_SU) using the In-band signaling mode. The NET ID and requesting MET Directory Number are included in the NR_SU. The FES starts the Lost Speaker timeout (Nominally, for example, 3.5 secs). The FES also connects the Net Radio call to a dispatcher, as appropriate.

Upon reception of the NRCHA_SU on the GC-S channel, the MET stops timer $T_M24$ and checks the call type. For Net Radio service call types, the MET tests the NET ID to determine what action to take. If the NET ID received matches one of the NET IDs assigned to the MET and if one of the following conditions is true, the MET accepts the Net Radio channel assignment and tunes to the assigned frequencies. If the NET ID does not match any NET ID assigned to the MET, or if none of the following case is true, then the MET ignores the NRCHA_SU and remains tuned to the GC-S channel.

Case 1: The Monitor code for the NET ID indicates a mandatory response.

Case 2: The Monitor code for the NET ID indicates a conditional response and the condition criteria permit the MET to respond to the assignment.

If the MET accepts the Net Radio channel assignment, then it alerts the user to the Net Radio call with appropriate audio and/or visual displays. The MET then starts timer $T_M1$. (Nominally, for example, 10 seconds). If timer $T_M24$ expires, or a call failure is received, the MET indicates call failure to the user. Upon acquisition of the FES-C channel, the MET stops timer $T_M1$ and decodes the NR_SU using the scrambling vector determined from the Access Security Key. If the MET has a Net Radio call request outstanding, it verifies the NET ID and confirms that its user's Directory Number matches the Speaker ID. If there is no outstanding request, the MET only verifies the NET ID.

The MET tests the Speaker ID and if it matches its DN, it generates an audio and/or visual alert to the user and enable transmission. If $T_M1$ expires or the NET ID received on the communications channel does not match the assigned NET ID, the MET indicates call failure to the user and retunes to the GC-S channel.

MET Call Monitoring Procedure

Figure 31:
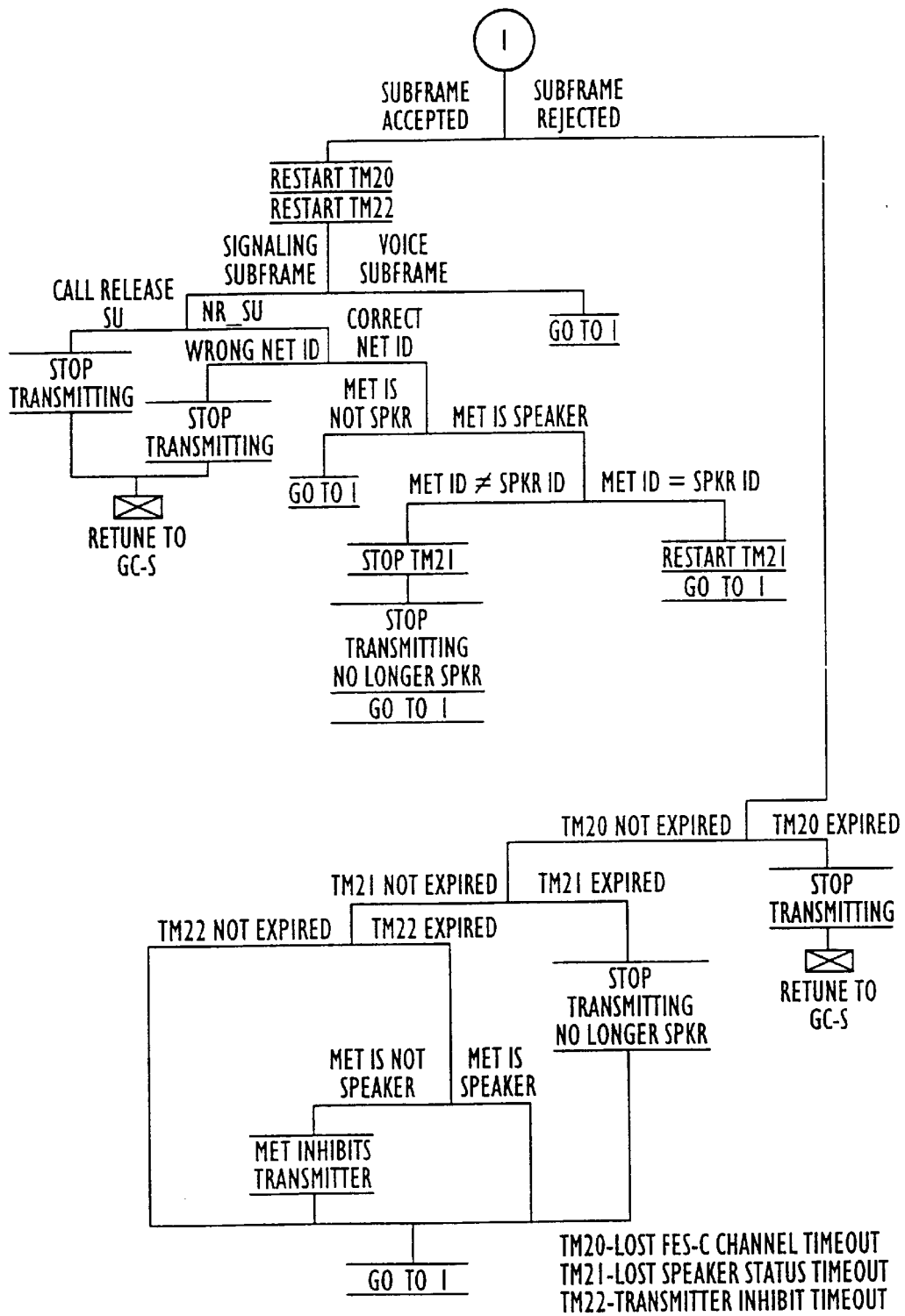
FIG. 31 is an illustration of a MET call monitoring event tree.

MET Call Monitoring defines the procedures followed by a MET while assigned to a Net radio call. The MET monitors the FES-C channel and operates timers on loss of the carrier. The procedures determine when to permit PTT requests, disable transmission, or re-tune to the GC-S channel. After accepting a NRCHA_SU and tuning to the assigned frequencies for a net radio call, a MET follows the call monitoring procedures specified herein and as shown in FIG. 31.

Upon accepting the NRCHA_SU the MET starts timers $T_M20$, the Lost FES-C channel timeout (Nominally, for example, 10 secs), and $T_M22$, the Transmit Inhibit timeout (1 superframe). The MET monitors the FES-C channel and generally only enables transmission if all the following conditions are true:

the MET is in receipt of the FES-C channel, indicated when timers $T_M20$, and $T_M22$ are not expired;

the MET is a member of the NET ID;

the Speaker ID is the vacant ID or is equal to the MET user's DN;

the user initiates PTT signaling. The transmitting MET continues transmitting provided all of the following conditions are true:

the MET is in receipt of the FES-C channel, indicated when timers $T_M20$, and $T_M21$ are not expired. ($T_M21$ is defined in MET Call Supervision Procedure below);

the current speaker as saved by the MET (see below) matches the MET's DN; and the PTT remains active.

The MET tests for a valid subframe at each FES-C subframe interval. When the MET receives a valid subframe, the MET restarts timers $T_M°$ and $T_M22$. A valid subframe is a voice subframe or a subframe having a message type recognized by the MET as a Net Radio message type and no errors are detected in the packet. If the subframe received is a voice frame, or a NR_SU where the Speaker ID matches the MET's DN, (i.e. the MET is confirmed as the "speaker"), the MET restarts timer $T_M21$, "loss of speaker status timeout".

If the subframe received is a NR_SU, the MET tests the NET ID. If the NET ID is not valid for the MET, the MET shall retune to the GC-S channel. If the NET ID is valid, the MET saves the Speaker ID as the current speaker. If the Speaker ID matches the MET's DN, the MET confirms, or maintains it's status as the "speaker". If the Speaker ID does not match the MET's DN, the MET ceases transmitting, if it was transmitting, and negates it's status as the speaker.

If the subframe received is a Net Radio Call Release (NRCR) SU, the MET ceases transmitting and retunes to the GC-S channel. On expiration of timer $T_M22$, the MET checks its speaker status. If the MET has the speaker status it ignores the timeout and continues transmitting. If the MET's speaker status is negated, it inhibits further PTT requests until all of the conditions listed above to enable transmission are satisfied.

On expiration of timer $T_M21$, the MET stops transmitting, and negates or clears it's status as the current speaker. The MET indicates to the user that transmission has ceased. The MET remains on the assigned Net Radio channel. On expiration of timer $T_M20$, the MET retunes to the GC-S channel.

MET Call Supervision Procedure

Figure 32:
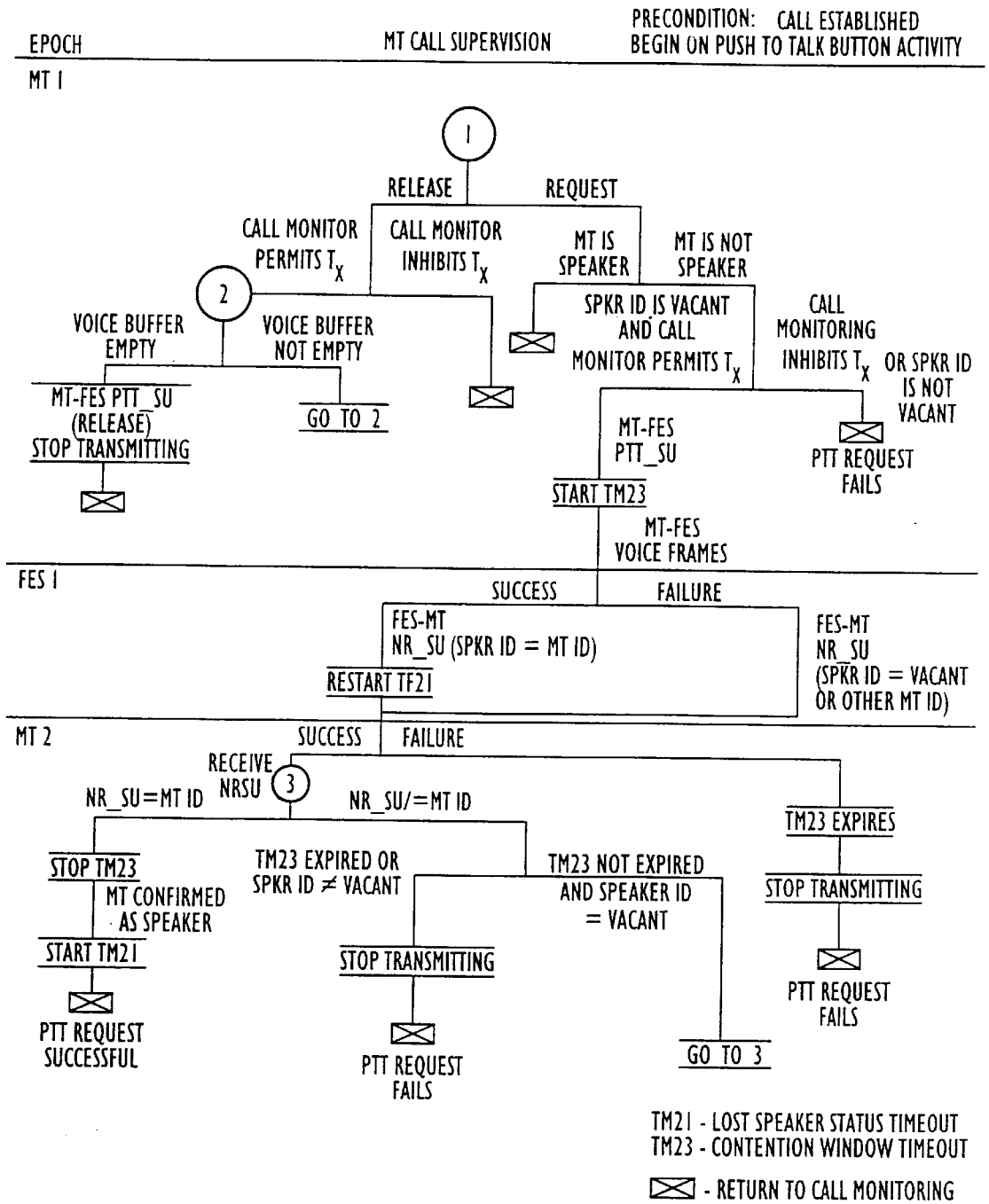
FIG. 32 is an illustration of a MET call supervision event tree.

MET call supervision defines the procedures followed by a MET when the PTT button is pressed or released. The procedures, together with the FES Net Radio procedures provide contention resolution of the inbound channel. The MET accesses the MET-C channel for transmission when the PTT is activated by the user in accordance with the MET call monitoring specified above and the call supervision specified herein, and by the event tree given in FIG. 32.

Figure 33:
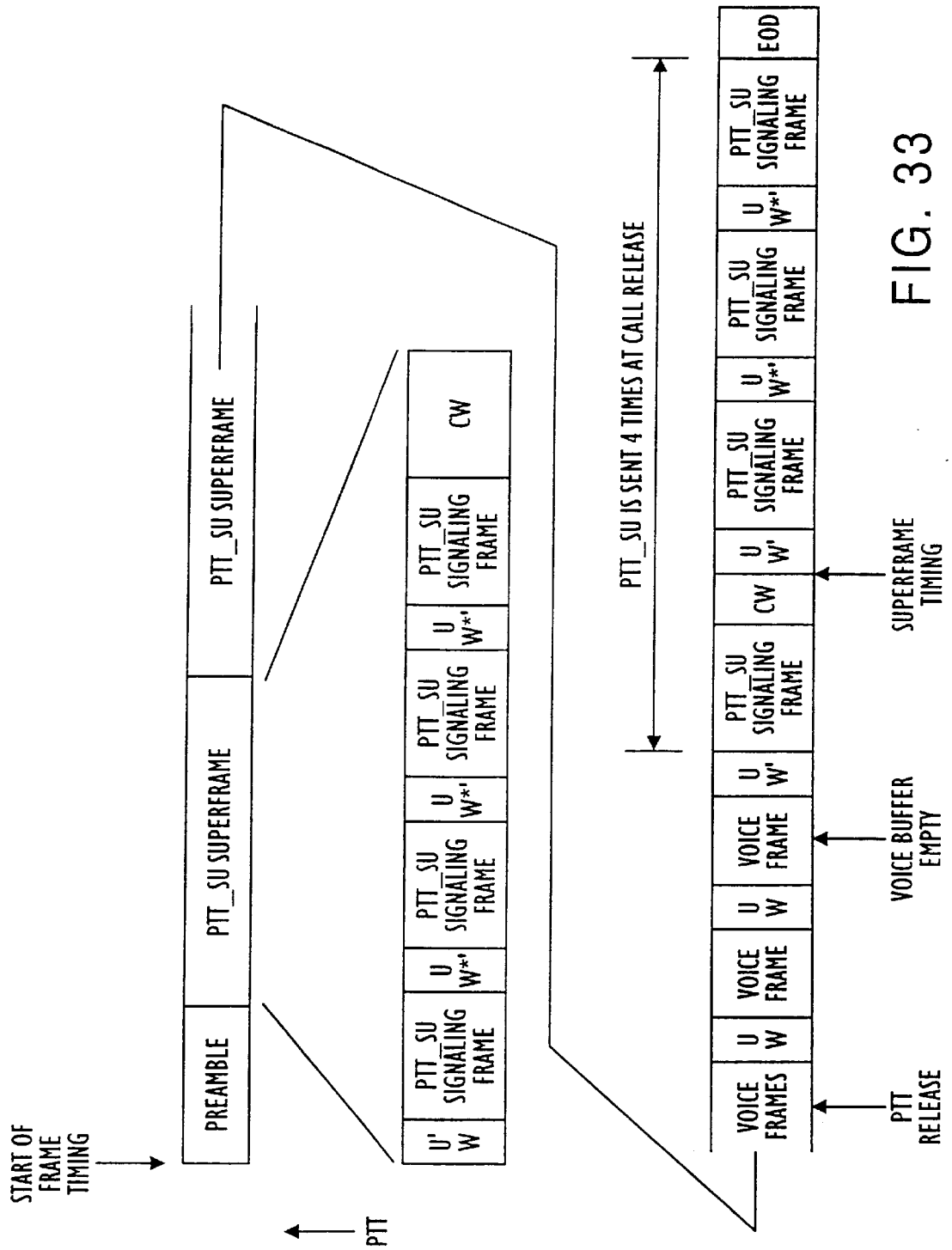
FIG. 33 is an illustration of a MET PTT frame structure.

To access the MET-C channel, the MET transmits a PTT_SU using the In-band signaling mode for one frame as shown in FIG. 33 until an NR_SU is received with the Speaker ID not equal to the vacant code. The PTT_SU includes the MET user's DN and the NET ID. The MET then switches to voice mode and starts timer $T_M23$, the contention window timer (Nominally, for example, 1 second).

The MET continues transmitting on the MET-C channel and monitoring the FES-C channel. On detection of In-band signaling subframes with NR_SUs, the MET tests the Speaker ID. If it matches the MET's DN, the MET saves the Speaker ID as the current speaker. The MET is then confirmed as the speaker. If the Speaker ID does not match the MET's DN, the MET ceases transmitting. The MET saves the Speaker ID as the current speaker. The MET negates or clears its speaker status.

If the MET detects voice mode subframes an the FES-C channel instead of In-band signaling subframes, it assumes that these voice frames are either its own, or the dispatcher's and that the Speaker's ID SU was missed. In this case the MET continues transmitting. An NR-SU is sent to the MET in the next superframe. If an NR_SU with the MET's DN as speaker ID is not received before the expiration of $T_M23$, the MET ceases transmitting. The MET then negates its speaker status.

When the MET is confirmed as the speaker, the MET starts timer $T_M21$, the Lost Speaker Status timeout (Nominally, for example, 3.5 secs). In addition the MET disables passing voice output to either the extended speaker or the handset speaker. The MET continuously transmits while the PTT button is active and conditions specified in the MET call monitoring procedures are met.

When the user releases the PTT button and the MET has been transmitting, the MET finishes transmitting any voice subframes remaining in the buffer, and then switches to In-Band signaling mode as shown in FIGS. 33 and 34. The MET transmits one frame using the In-band Signaling mode consisting of PTT_SUs. The PTT_SU identifies the MET user's DN and the NET ID and the PTT Release Code. The MET then ceases transmitting, but remains tuned to the net radio frequencies, and continues to monitor the FES-C channel for the NET ID in accordance with the MET call monitoring procedures. After the user releases the push to talk, the MET waits for a time equal to or greater than the delay time before enabling the loudspeaker again.

Call Release

Figure 35:
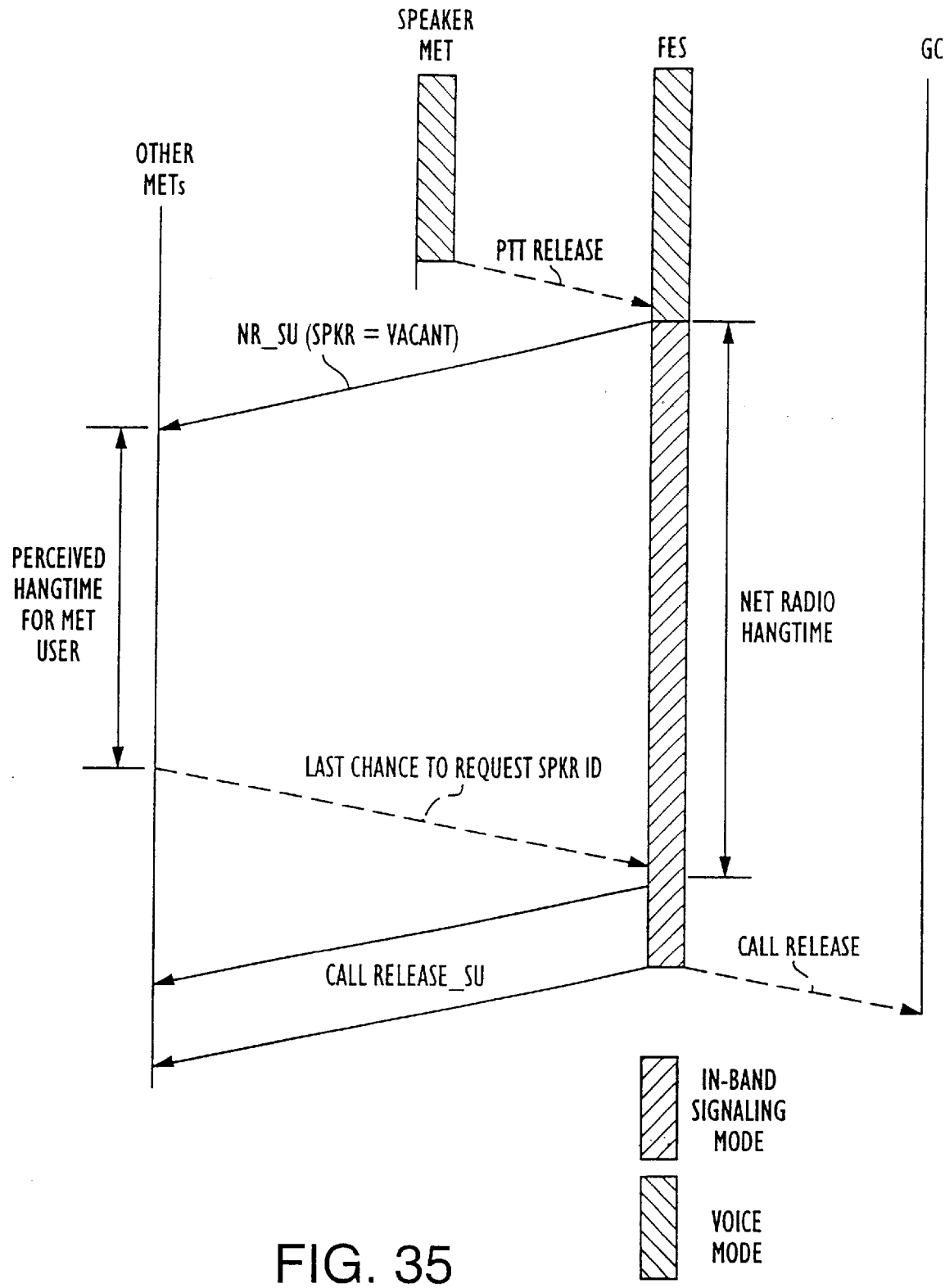
FIG. 35 is an illustration of a perceived hangtimer for MET users.

Upon receiving the Net Radio Call Release SU, the MET tuned to the FES-C channel retunes to the GC-S channel and deactivates the Net Radio call indicator to the user. The FES operates a hangtimer. When no activity has occurred for the hangtime duration, the FES releases the call. The hangtimer, perceived by a MET user is shown in FIG. 35.

Private Mode Service Call Procedures

The Network Control System procedures for MET originated Private Mode Service calls allow mobile CUG members to originate a call using a Net Radio channel configuration for the purpose of private communications with another member of the CUG. More than one NRC may be configured at a FES using the same NET ID. This permits more than one Private Mode call to be in progress at the same time.

Channel Assignment

Figure 36:
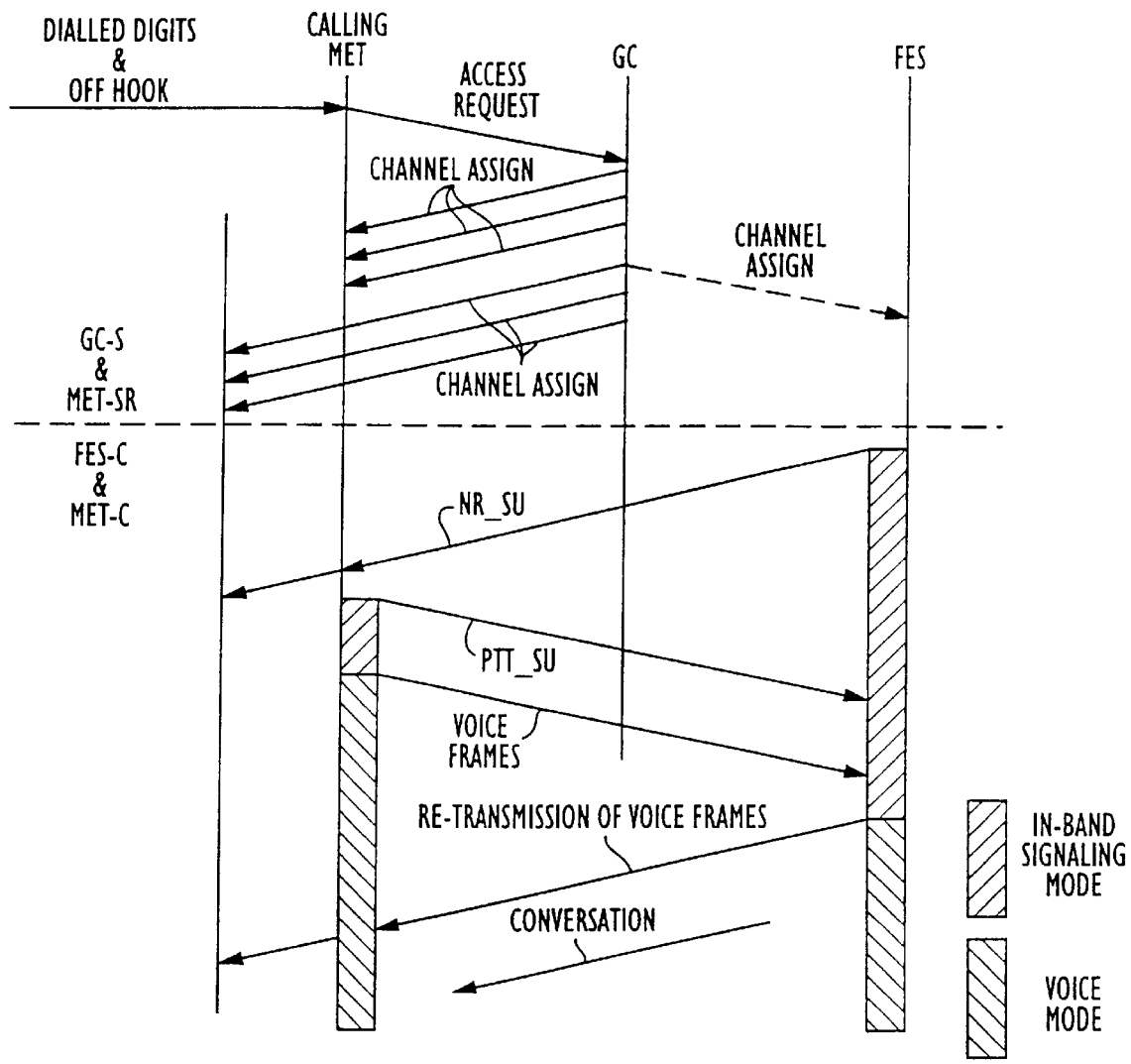
FIG. 36 is an illustration of a MET originated private mode call setup message flow.

MET originated Private Mode service calls are established using the sequence of messages shown in FIG. 36. The protocol employed is as specified for Net Radio service in the event tree given in FIG. 29. On selection of Private Mode service, and on receipt of dialed digits, a MET, suitably equipped for Private Mode service formats and sends a Net Radio Access Request SU using MGSP on the MET-SR channel. The NRACR_SU includes the NET ID private mode with the called DN. If no NET ID with a NET ID Tag number of '00 hex' has been assigned to the MET, the MET indicates call failure to the operator.

Upon receipt of the NRACR_SU the GC performs all the verifications as specified for MET originated Net Radio service calls. Once the GC determines that the call can be completed it selects the frequency assignments required for the NET ID and formats a NRCHA_SU with the call type field set for Private Mode and the MET FTIN number of the calling MET in place of the NET ID. The GC sends the assignment SU three times as for Net Radio service on the GC-S channel.

The GC formats a second Private Mode call type NRCHA_SU using the called MET FTIN number in place of the NET ID. The GC sends this assignment SU three times as for Net Radio service on the GC-S channels required for the NET ID. In the event there are no NRC's available to handle the call, the GC sends a Call Failure Message with no resources as the cause indication to the requesting MET. Upon receipt of the NRCHA_SU with the Private Mode call type, a MET compares it's FTIN with the FTIN in the NUCHA_SU. If the numbers match, the MET tunes to the assigned frequencies. The MET then proceeds as for Net Radio service calls.

Call Establishment, Call Monitoring, Call Supervision and Call Release

The MET uses the call establishment, call monitoring, call supervision and call release procedures as specified for Net Radio service calls.

Priority 1 Service Call Procedures

Figure 37:
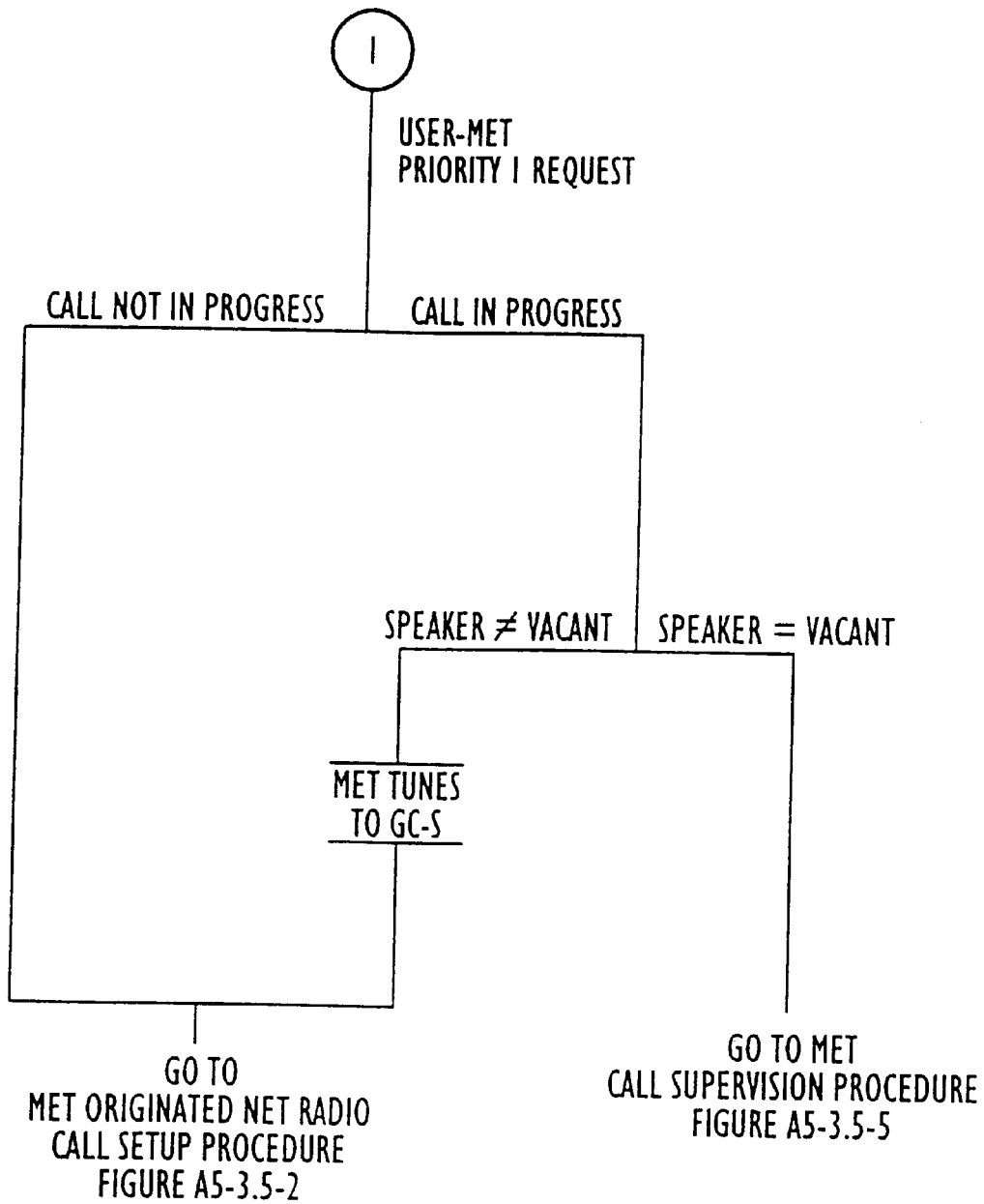
FIG. 37 is an illustration of a MET Priority 1 event tree.

The MET shall follow the Priority 1 procedures as specified in this section and as shown by the event tree given in FIG. 37. The MET supports a Priority One mode of operation called the normal mode.

Priority One Normal Operation

When the MET user initiates Priority 1 service, the MET takes one of three actions based on the state of the MET at the time. The three states are:

Case 1: Net radio call is not in progress.

Case 2: Net Radio call in progress and the current Speaker ID is equal to the vacant code.

Case 3: Net Radio call in progress and the current Speaker ID is not the vacant code.

Case 1

In the case where the Net Radio call is not in progress, the MET originates a Net Radio Call. The MET appends the Priority 1 code to the Net ID in the Net Radio Access Request SU. The NET ID used is either NET selected, or if no NET ID is selected, a NET ID selected by the MET user. The MET proceeds with call establishment, call monitoring, call supervision, and call release as for MET originated Net Radio service.

Case 2

In the case where the Net Radio call is in progress and the speaker ID is vacant, the MET follows call supervision procedures. The MET appends the Priority 1 code to the NET ID. The MET can optionally use the procedure described in Case 3 below for response to Case 2.

Case 3

In the case where the Net Radio call is in progress and the speaker ID is not the vacant code, the MET tunes to the GC-S channel and sends a NRACR_SU with the Priority 1 code appended to the Net ID as for Case 1.

Although a number of arrangements of the invention have been mentioned by way of example, it is not intended that the invention be limited thereto. Accordingly, the invention should be considered to include any and all configuration, modifications, variations, combinations or equivalent arrangements falling within the scope of the following claims.

DICTIONARY ITEMS AND DEFINITIONS

Actual GSI
Definition: Current GSI based on TDM changes during MET operation. This field is populated by the NOC based on actions on the CGS. The CMIS cannot create or update this field.

Call Barring Inbound/Outbound Flag
Definition: Describes the call barring entry as applying to incoming or outgoing calls. If the Call Barring List is flagged as Inbound, it applies to calls the MET is receiving. If the Call Barring List is flagged as Outbound, it applies to calls the MET is making.

Call Barring Include/Exclude Flag
Definition: Describes the call barring entry as an included (legal) call or an excluded (illegal) call. When a Call Barring List is flagged as Include, the MET may only make calls to the numbers or NPAs on the list. Any other call would be denied. Conversely, if a Call Barring List is flagged as Exclude, the MET may make calls to any number or NPA except those on the list.

Call Barring List Value
Definition: Numbering plan area or phone number in the call barring list. The values that appear in the list are the phone numbers or NPAs that the MET's restriction apply to. The types of restrictions are dictated by the flags for Include/Exclude and Inbound/Outbound Call Barring.

Call Trap Flag
Definition: Indicates call trapping has been initiated for the MET. The GC will trap MET states as they change during MET CGS activity. This information will be provided to the CMIS on a call record.

Call Type
Definition: Service available on the MET. There are four service types: voice data (2400 or 4800 baud), fax, and alternate voice data (avd). For each service the mobile is registered, a service record is created with a single call type indicated. This call type in turn has a unique mobile identification number (min) associated with it.

Carrier
Definition: Name of preferred IXC carrier. This field is a switch field used to support equal access to long distance carriers.

Cellular ESN
Definition: 32 bit ESN that is used by the switch. For dual mode cellular/satellite phones it is the ESN for the cellular portion of the phone and would match the ESN used by the home cellular carrier to identify that mobile terminal.

CGS Time Stamp
Definition: Time stamp was created/modified. Part of the notification of success or failure of CGS action. Not created or updated by CMIS.

Channel Spacing
Definition: Multiple of frequency step size. This element is a characteristic of the MET Class. CMIS will only have the MET Class ID that a particular METs equipment maps to. NE originates this and other data that describes the MET Class and sends it to the NOC.

Check String
Definition: Constant used by the GC to validate the encryption/decryption algorithm. This element is related to the ASK.

Commanded GSI
Definition: Set by CMIS this is the original GSI stored as a NVRAM (non-volatile RAM) parameter by the MET. Required for each new MET registered for service. This element is used by the MET to tune to a GC-S channel during commissioning on the CGS. Without the GSI the MET is incapable of logging on to the CGS.

Configuration File
Definition: A file containing the contents of a working configuration that has been saved to disk under a unique name.
Current Configuration
Definition: The set of resources that exist in the configuration most recently sent to or received from the NOC. This is assumed to be the actual configuration of the traffic bearing network at any given time.
Commit a Resource
Definition: Explicit engineer action to add a fully provisioned interim resource to the working configuration.
Control Group ID
Definition: The CGS is divided into Control Groups that contain circuit pools, signaling channels, bulletin boards, METs, and VNs. A MET may only belong to one Control Group. The control Group assignment is based on the virtual network membership. All VNs a MET is a member of must be in the same control group.
Cust Group
Definition: Identifier for a specialized routing information used at the switch (e.g., 1024 available cust groups per MSR). Dialing plans will be implemented for groups of customers through a Customer Group (Cust Group).
Data Hub Id
Definition: Used to route messages during PSTN to IVDM call setup to the proper data hub. This is only applicable for METs that are participating in the Mobile Packet Data Service.
Date Last Tested
Definition: Time stamp of most recent commissioning test. This field is populated by the NOC and cannot be created or updated by CMIS.
Default VN
Definition: VN selected if user does not specify VN during dialing. For METs that belong to only one VN, this can be populated with the VN ID the MET is assigned to by default.
EIRP
Definition: Equivalent Isotropic Radiated Power—power level required for a MET to receive a satellite signal. This element is a characteristic of the MET Class. CMIS will only have the MET Class ID that a particular METs equipment maps to. NE/SE originates this and other data that describes the MET Class and sends it to the NOC.
Event Argument Id
Definition: Part of the Event Record received from the NOC. CMIS has no part in creating or updating events—they arrive unsolicited from the NOC.
Event Argument Type
Definition: Part of the event Record received from the NOC. CMIS has no part in creating or updating events—they arrive unsolicited from the NOC.
Event Argument Value
Definition: Part of the Event Record received from the NOC. CMIS has no part in creating or updating events—they arrive unsolicited from the NOC.
Event Argument VMS Type
Definition: Part of the Event Record received from the NOC. CMIS has no part in creating or updating events—they arrive unsolicited from the NOC.
Event Code
Definition: Part of the Event Record received from the NOC. CMIS has no part in creating or updating events—they arrive unsolicited from the NOC.
Event Severity
Definition: Network impact assessment of the trouble event.
Event Time
Definition: Time the event occurred within the network.
Event Type
Definition: Part of the Event Record received from the NOC. CMIS has no part in creating or updating events—they arrive unsolicited from the NOC.
External Date Time Stamp
Definition: CMIS generated time stamp used for CMIS audit purposes in exchanging messages with the CGS.
External Transaction Id
Definition: CMIS generated transaction id used for CMIS audit purposes in exchanging messages with the CGS.
Feature Set
Definition: Identifies MET features within a specific VN. Fixed features are set up during order processing and require no action by the MET user to invoke a feature. MET activated features must also be set up during order processing but will only be available through some action on the part of the MET use during call process.
FIXED FEATURES include:
  Calling Line Id Presentation (CLIP)—display the calling party's number to a MET.
  Calling Line Id Restriction (CLIR)—prohibition from displaying the METs number when it is calling another party.
  Connected Line Id Presentation (COLP)—display the number the calling MET is connected to.
  Connected Line Id Restriction (COLR)—prohibit display of the connected MET's number to the calling party.
  Sub-addressing (SA)—allows one or more attachments to the MET to be addressed. This is being accomplished through unique phone numbers for service types requiring different equipment.
  Call Waiting (CW)—notification to a MET engaged in the call that another call is waiting. MET may accept the other call or ignore it.
  Call Barring (CB)—restricts the MET user's from making or receiving one or more types of calls.
  Operator intervention (OI)—allows an operator to break into a call in progress for the MET.
  Operator Assistance (OA)—allows the MET to access an MSAT operator to receive assistance
  Call Priority (CP)—used in conjunction with the system's call queuing function (trunk access priority) presence of this feature gives a MET access to channels at times of congestion ahead of MET's with lower priority. Priority applies only to MET initiated calls.
MET ACTIVATED (dynamic) FEATURES include:
  Call Transfer (CT)—allows sa MET user to transfer an established call to a third party.
  Call Forwarding Unconditional (CFU)—permits a MET to have all calls forwarded to another MET or PSTN number.
  Call Forwarding Busy (CFB)—permits a MET to have all incoming calls attempted when the MET is busy to another MET or PSTN number.
  Call Forward Congestion (CFC)—permits the MET to have all incoming calls attempted when the signaling channels are congested answered with a recorded announcement intercept.
  Call Forward No Reply (CFN)—permits a MET to have all incoming calls attempted when the MET is not answering to another MET or PSTN number. This applies if the MET is blocked, turned off or not answering.

Call Holding (CH)—allows a MET to interrupt call communication on an existing connection and then re-establish communications.

Alternate Voice Data Operation (AVD)—allows a MET user to toggle between voice and data mode during a call. Requires that the call be initiated in voice mode. Only the MET user may toggle between voice and data. This requires a special service type in addition to the activation at set-up of the feature.

Conference calling (CC)—allows a MET to communicate with multiple-parties including METs and PSTN concurrently.

Three Party Service (3PS)—allows a MET to who is active on a call to hold that call, make an additional call to a third party, switch from one call to the other (privacy being provided between the calls) and/or release one call and return to the other.

Malicious Call Trace (MCT)—enables an MSAT operator to retrieve the complete call record at a MET's request for any terminated call in real-time. The operator can then identify the calling party to the MET and take appropriate action.

Voice Mail (VM)—allows call forwarding to a voice mail box and retrieved of messages by the MET.

Alternate Accounts Charging (ACC)—allows the MET user to enter in an account code to charge the call to after entering the dialed digits Fully Provision
Definition: Supply values to all attributes of a resource
Frequency Step Size
Definition: Minimum tuning increment acquired for a MET to tune in an assigned channel. CMIS will only have the MET Class ID that a particular MET's equipment maps to. NE originates this and other data that describes the MET Class and sends it to the NOC.
From MET Call Barring Flags
Definition: Describe actions available to a user originating a call from a MET. These call Barring flags relate to specific types of calls at an aggregate level to indicate if the MET can make or receive a call of a particular type. When this list indicates that an Inclusion or Exclusion to particular numbers or area codes is allowed, the values for those restrictions are indicated on a Call Barring List.
FTIN
Definition: Forward Terminal Identification Number—Downloaded to MET from NOC during commissioning. Used for MET to GC signaling.
Internal Data Time Stamp
Definition: NOC generated time stamp used for NOC audit purposes.
Internal Transaction Id
Definition: NOC generated transaction is used for NOC audit purposes.
Interim resource
Definition: The resource currently being modified by the engineer. Changes made to an interim resource are not added to the working configuration until the resource is committed to the working configuration
L Band Beam
Definition: Current beam MET is logged into. Determined by the GC during commissioning. CMIS has no role in creating or updating this field.
LCC
Definition: Line Class Code—type of phone, required by the switch.

MCC Class Id
Definition: Part of the Event Record received from the NOC. CMIS has no part in creating or updating events—they arrive unsolicited from the NOC.
MCC Instance
Definition: Part of the Event Record received from the NOC. CMIS has no part in creating or updating events—they arrive unsolicited from the NOC.
MCC Instance Id
Definition: Part of the Event Record received from the NOC. CMIS has no part in creating or updating events—they arrive unsolicited from the NOC.
MCC Instance Type
Definition: Part of the Event Record received from the NOC. CMIS has no part in creating or updating events—they arrive unsolicited from the NOC.
Message Status 1
Definition: Used in the message initiated by the NOC to acknowledge success or failure of a previously transmitted CMIS request. Used by the DM.
Message Status 2
Definition: Used in the message initiated by the NOC to acknowledge success or failure of a previously transmitted CMIS request. Will be used by the DM.
Message Verb
Definition: Action required at the NOC on data passed in a message from CMIS. This field is in the message relaying the results of a CMIS request.
Modulation Scheme
Definition: Non-standard modulation schemes. CMIS will only have the MET Class ID that a particular MET's equipment maps to. NE/SE originates this and other data that describes the MET Class and sends it to the NOC.
MSA
Definition: Mobile Servicing Area—identifies the last call's servicing area. Atomic data element within MSR. Transient data maintained in call processing not on the cellular switch table. Same as MSR.
MSR
Definition: Mobile Servicing Region id (table) contains multiple MSA assignments for the MET. For a roamer, the operator will input the MSR for temporary assignment. Allows up to 1024 cust groups—At CGS startup there will be 1 MSR.
MET ASK
Definition: Access Key MET must match during call setup/validation.
MET Class ID
Definition: Identifies the operating characteristics of the MET. Associated to MET by CMIS during registration from data supplied by NE/SE. The technical characteristics the MET Class ID encompasses are not needed by CMIS. These are stored on a table in the NOC and referenced by having the ID on the MET Information record. This ID applies to MET level regardless of how many services, etc. the MET has tied to it.
MET Commanded State
Definition: Current CGS status of MET.
MET Fraud Flag
Definition: Indicates fraud has been detected on the MET. Updated by GC and CMIS only. This field is set at the MET level regardless of the number of services, etc. the MET has.
MET ID
Definition: CMIS assigned unique MET identifier. This can be a unique random number assigned to each MET registered for service. This is a MET level characteristic set once for the MET regardless of how many services, etc. the MET has. The MET ID is used by the NOC to identify METs. It does not have to be used within CMIS as a key field. MET ID cannot be updated once it has been assigned. A MET that requires a new MET ID for any reason would have to go through the registration process anew.

MET Signaling Code
Definition: Dialed digits from MET that identifies VN selection. Signaling codes would be assigned when a MET has multiple Virtual Network memberships. After the MET user enters the destination phone number, the pound key is hit and then the signaling code is entered if the caller wants to associated the outbound call with a particular virtual network. When no signaling code is entered, implies default VN be associated with the call.

Net Radio Monitor Code
Definition: Controls MET responses to specific channels after hang time limit is exceeded. A NR Net selection is made at the MET by the user.

Net Radio MET Directory Number
Definition: Net radio MET directory number. Assigned during registration.

Net Radio Net Id
Definition: Net ID

Net Radio MET Directory Number
Definition: Tag number on the MET equipment that identifies a particular net radio net.

Pending NVRAM Init Flag
Definition: Instructs the GC to download/initialize parameters for a MET.

Pending PVT Flag
Definition: This flag indicates that a PVT is required following next MET access. If CMIS requests a PVT to help diagnose customer troubles, an update would be sent to NOC with the Flag set to Perform PVT after Next MET access (1).

Picsel
Definition: Flag indicating if user has asked for a preferred IXC carrier. Carrier name is contained in CARRIER field.

Record Type
Definition: Type of record defined by object. Part of the Update Results Record.

Remote
Definition: Remote user—not required by the switch for MSAT Application.

Recent Configuration Event
Definition: This is a serial list of events received from the NOC that pertain to configuration database changes.

Referential Integrity
Definition: Database "key field" relationships that bind record within the databases, and create dependencies for additions and deletions of table instances.

RF Pin
Definition: Remote feature personal identification number. A user is prompted for a pin when attempting to use a remote feature.

Roam
Definition: Roam Capable—not required by the switch for MSAT Application.

RTIN
Definition: Reverse Terminal Identification Number which is also the satellite electronic serial number on satellite only and dual mode cellular/satellite METs. This is a unique identifier assigned by manufacturer for each piece of equipment. Within CGS processing the RTIN is used by the GC to signal the MET.

Satellite Id
Definition: Satellite Id of current L-band beam. The NOC populates this field based on MET commissioning. CMIS does not ever create or update this field.

SCM
Definition: Station Class Mark.

Secure Disable Flat
Definition: Channel Unit security check flag. Setting this flag to bypass security would disable ASK verification during call processing for a MET. CMIS cannot change this flag.

Signaling Priority
Definition: Number of MET signaling requests to the GC during network congestion. Assigned at the MET level— each MET may have only one signaling priority regardless of the number of VN memberships it has. The highest priority level is 0 and the lowest is seven.

TDM Change Enable Flat
Definition: Restriction on MET from changing TDM (TDM is the GSI)

Telephone Number
Definition: Phone number associated with a call type (voice, data, fax, avd) in a given virtual network.

Template
Definition: An initial set of default attribute values for each resource being added.

To MET Call Barring Flags
Definition: Describes actions available to a user receiving a call at their MET.

Trunk Access Priority
Definition: Satellite trunk queuing priority used during network congestion. Determines access to channels.

Virtual Network Id
Definition: Identifies the Virtual Network that the service and feature profiles relate to. Within a single VN a MET may have one voice, data, fax and/or avd service type. Features and restrictions for those services are defined on the basis of the METs membership in that VN. If the MET required an additional instance of a service that it already subscribed to, (e.g. a second voice number), a second virtual network assignment would be required. Features and restrictions for that second membership can be defined with no relation to the existing VN membership, but all elements that relate to the MET level cannot change without a ripple effect to the other services.

VMS Instance Type
Definition: Part of the Event Message

Vocoder Id
Definition: Vocoder version currently installed in the MET. CMIS will only have the MET Class ID that a particular METs equipment maps to. NE/SE originates this and other data that describes the MET Class and sends it to the NOC.

Working Configuration
Definition: The set of resources currently being modified by the engineer. This may be an existing, complete configuration which the engineer is modifying, or may be a new, partial (or initially empty) configuration.

GLOSSARY

A Availability
AAC Airline Administrative Communications
AARM Access Authentication Request
ABH Average Busy Hour
AC Alternating Current
ACU Access Channel Unit
ACU Antenna Control Unit AD Attribute Dictionary
AEDC After Effective Date of Contract
AFC Automatic Frequency Control
AFS Antenna/Front-end Subsystem
AGC Automatic Gain Control
AIOD Automatic Number Identification Outward Dialing
AMI Alternative Mark Inversion
AMPS North American Analog and Digital Cellular Networks
AMSC American Mobile Satellite Corporation
AMS(R)S Aeronautical Mobile Satellite (Route) Service
AMSS(R) Aeronautical Mobile Satellite Services (Reserved)
ANI Automatic Number Identification
ANSI American National Standards Institute
ANT Antenna
AOC Aircraft Operational Communications
APC Airline Passenger Communications
API Applications Program Interface
AR Automatic Roaming
ARC Atlantic Research Corporation
ASK Access Security Key
ASN.1 Abstract Syntax Notation One
AT Command set for a DTE to communicate with asynchronous host
ATC Air Traffic Control
AVD Alternate Voice/Data Calls
AWGN Additive White Gaussian Noise
AZ Azimuth
B8ZS Bipolar with 8 Zeros Substitution
BB Bulletin Board
BBS Bulletin Board Service
BER Bit Error Rate
BERT Bit Error Rate Tester
BID Beam Identifier Code
BIT Built In Test
BITE Built-In Test Equipment
BPS Bits Per Second
BS Base Station
BSPU Baseband Signaling Processing Unit
BSS Base Station Switch
C/No Carrier to Noise Power Density Ratio
CAC Channel Access and Control
CAF Call Failure Message
CCCS Command, Control, and Communications Subsystem
CCIR Consultative Committee International de Radio
CCITT Consultative Committee International Telegraph and Telephone
CCU Communications Channel Unit
CD Call Delivery
CDR Call Detail Record
CDR Critical Design Review
CDRL Contract Data Requirements List
CE Common Equipment
CG Control Group
CGID Control Group Identification Number
CGS Communications Ground Segment
CHA Channel Assignment Message
CHREL Channel Release Message
CHREQ Channel Request Message
CI Configuration Item
CIBER Cellular Intercarrier Billing Exchange Roamer
CIC Carrier Identification Code
CM Configuration Management
CMIP Common Management Information System
CMIS Configuration Management Information System
CMIS Customer Management Information System
COTS Commercial off-the-Shelf
CP Circuit Pool
CPD Call Processing Demonstration
CPS Circuit Pool Segment
CPU Central Processing Unit
C/PV Commissioning/Performance Verification
CRC Cyclic Redundancy Check
CS Communications System
CSC Computer Software Component
CSCI Computer Software Configuration Item
CSDT Channel Switchover Detection Time
CSF Critical System Functionality
CSMA/CD Carrier Sense Multiple Access with Collision Detection
CSMP Circuit Switch Management Processor
CSMPCS Circuit Switch Management Data Processor Equipment Communications System
CSPU Channel Signal Processing Unit
CSR CAC Statistics Request
CSREP Call Status Reply Message
CSREQ Call Status Request Message
CSU Computer Software Unit
CSUG Computer Software Unit Group
CTB Customer Test Bed
CTN Cellular Telephone Network
CTN Cellular Terrestrial Network
CTNI Cellular Telephone Network Interface
CU Channel Unit
CUD Call User Data
CUG Closed User Group
CUP Channel Unit Pool
CUS Channel Unit Subsystem
CVR Cellular Visitor Registration
CVRACK Cellular Visitor Registration Acknowledge
CW Carrier Wave
CWCHA Call Waiting Channel Assignment Message
DAMA Demand Assignment Multiple Access
db Database
dbc Decibel Relative to Carrier
dB decibels
dBi dB Relative to Isotropic
dBm dB relative to 1 milli watt
dBW decibels relative to 1 watt
D bit 'Data Configuration' bit in X.25
DBMS DataBase Management System
dBw dB Relative to 1 Watt
DC Direct Current
DCE Data Circuit Terminating Equipment
DCE Data Communications Equipment
DCL Digital Command Language
DCN Down CoNverter
DCR# Document Control Release #
DCU Data Channel Unit
DD Design Document
DDCMP Digital Data Communications Message Protocol
DDS Direct Digital Synthesis
DEC Digital Equipment Corporation
DECmcc Digital's Network Management System
DEQPSK Differential Encoded Quadrature Phase Shift Keying
DET Data Equipment Terminal
DFD Data Flow Diagram
DH Data Hub
DH-D Outbound Time Division Multiplex Channel from Data Hub to Mobile Terminal
DHP Data Hub Processor
DHSI DH-D Selector Identification Code DID Direct Inward Dialing
DIDs Data Item Descriptions
DME Dial-Up Modem Emulation
DMQ DEC Message Queue
DMS Digital Multiplex System
DN Directory Number
DNS Digital Name Service
DOC Canadian Department Of Communications
DOD Direct Outward Dialing
DPSK Differential Phase Shift Keying
DQPSK Differentially Encoded Quadrature Phase Shift Keying
DS0 Digital Service Level Zero (single 64K b/s channel)
DS 1 Digital Service Level One (twenty four voice channels)
DSP Digital Signal Processing
DSSS 1 Digital Subscriber Signaling System 1
DTC Digital Trunk Controller
DTE Data Terminal Equipment
DTE Data Terminal Element
DTMF Dual Tone Multiple Frequency
DVSI Digital Voice Systems, Inc.
Eb/No Bit Energy to Noise Power Density Ratio
ECN Engineering Change Notice
EFD EF Data, Inc.
EFTIN Encrypted Forward Terminal Identification Number
E-I Exchange-Interexchange
EIA Electronic Industries Association
EICD Element Interface Control Document
EIE External Interface Equipment
EIRP Equivalent Isotropic Radiated Power
E1 Elevation
EMC ElectroMagnetic Compatibility
EMI ElectroMagnetic Interference
engengineer or engineering
EO End Office
EO External Organizations
EOD End of Data
ESN Electronic Serial Number
FAX Facsimile
FCA Functional Configuration Audit
FCC Federal Communications Commission
FCS Fading Channel Simulator
FDMA Frequency Division Multiple Access
FEC Forward Error Correction
FES Feederlink Earth Station
FES-C Inbound Communication channel from Feederlink Earth Station to Mobile Terminal
FES-I Interstation signaling channel from Feederlink Earth Station to Group Controller
FES/MT Feederlink Earth Station/Mobile Terminal
FES-RE Feederlink Earth Station-Radio Frequency Equipment
FES-TE Feederlink Earth Station Terminal Equipment
FFT Fast Fourier Transform
FIS Feederlink Earth Station Interface Simulator
FIT Fault Isolation Tests
FIU Fax Interface Unit
FMT Fixed Mobile Terminal
FMA Field Programmable Gate Array
FPMH Failures per Million Hours
FRO Frequency Reference Oscillator
FT Fault Tolerant
FTE Fax Terminal Equipment
FTIN Forward Terminal Identification Number
G/T Gain to System Noise Ratio
GBF Gateway/Base Function
GBS Gateway Base System
GC Group Controller
GC-I Interstation signaling channel from Group Controller to Feederlink Earth Station
GC-S Time Division Multiplex Signaling channel from Group Controller to Mobile Terminal
GCSST GC-S Search Time
GEN Generator
GHz Giga (1,000,000,000) Hertz (cycles per second)
Graphical Monitor And Control System
GPIB General Purpose Instrument Bus
GPS Global Positioning System
GS Gateway Station
GSI GC-S Selector Identifier
GW Gateway
GWS Gateway Switch
GWS/BSS Gateway Switch/Base Station Switch
H/W Hardware
HCHREQ Handoff Channel Request
HDP Hardware Development Plan
HLR Home Location Register
HMI Human Machine Interface
HOT Hand-off Test
HPA High Power Amplifier
HRS Hardware Requirements Specification
HWCI Hardware Configuration Item
HW/SW Hardware/Software
Hz Hertz
I In Phase channel
IAW In Accordance With
IC Interexchange Carrier
ICD Interface Control Document
ICI Instrument Control Interface
ICP Intelligent Cellular Peripheral
ICU Interstation Channel Unit
ICWG Interface Control Working Group/Interface Coordination Working Group
ID Identification
IEEE Institute of Electrical and Electronics Engineers
IF Intermediate Frequency
IFIS Intermediate Frequency Subsystem
IFL Interfacility Link
IF IFL Intermediate Frequency Internal Facility Link
IHO Interstation Hand-Off
IICD Internal Interface Control Document
IICWG Internal Interface Control Working Group
IM Intermodulation
IMBE Improved Multiband Excitation
IOC Input/Output Controller
IP Internet Protocol
ISCU Interstation Signaling Channel Unit/Interstation Channel Unit
ISDN Integrated Services Digital Network
ISL Interstation Signaling Link
ISO International Standards Organization
IVDCPD Integrated Voice & Data Call Processing Demonstration
IVDM Integrated Voice/Data Mobile Terminal
KBPS Kilo (1,000) Bits per Second
kHz Kilohertz
KLNA K-band Low Noise Amplifier
KP Key Pulse
LAN Local Area Network
LAP Link Access Procedure
LAPB Link Access Procedure using a balanced mode of operation
LATA Local Access and Transport Area LBP Local Blocking Probability
LCN Logical Channel Number
LLCSC Lower Level Computer Software Component
LLNA L-band Lowe Noise Amplifier
LLS Lower Level Specification
LNA Low Noise Amplifier
LOI Level of Integration
LPP Link Peripheral Processor
LRU Line Replaceable Unit
LRU Lowest Replaceable Unit
LSSGR Loval Access and Transport Area Switching Systems Generic Requirements
MAP Maintenance Administrative Position
MAP Mobile Application Part
M bit 'More Data' bit in X.25
M&C Monitor and Control
MCC Management Control Center
MCGID Mobile Data Service Control Group Identification Number
MDLP Mobile Data Service Data Link Protocol
MDS Mobile Data Service
MDSR MDLP Statistics Request
MEA Failure Modes and Effects Analysis
MEF Minimum Essential Functionality
MELCO Mitsubishi Electronic Company
MET Mobile Earth Terminal (a.k.a. MT)
MET-C Communication Channel Between Mobile Terminal and Feederlink Earth Station
MET-DRd Inbound Slotted Aloha Data Channel
MET-DRr Inbound Slotted Aloha Reservation Channel
MET-DT Inbound Packet Time Division Multiple Access Channel
MET-SR Random Access Signaling Channel from Mobile Terminal to Group Controller
MET-ST Time Division Multiple Access signaling channel from Mobile Terminal to Group Controller
MF Multiple Frequency
MFID Manufacturer Identification
MGSP Mobile Terminal to Group Controller Signaling Protocol
MHz Mega Hertz (cycles per second)
MIB Management Information Base
MIR Management Information Region
MIRQ MT Initialization Request
MIS Mobile Terminal Interface Simulator
MIS Mobile Earth Terminal Interface Simulator
ML Message Layer
MLCSC Mid Level Computer Software Component
MLP Multilink Procedure
MMI Man Machine Interface
MMRS Mobile Road Service
MMSS Maritime Mobile Satellite Services
MNMS Mobile Data Service Network Management Subsystem
MNP Multi Network Protocol
MODEM MODulator/DEModulator
MOS Mean Opinion Score
MOV Method of Verification
MPLP Mobile Data Service Packet Layer Protocol
MPR MPR Teltech Inc.
MRI Minimum Request Interval
MRS Mobile Radio Service
MSAT Mobile Satellite
MSC Mobile Switching Center
MSS Mobile Satellite Service
MSSP Mobile Terminal Specialized Services Protocol
ms millisecond
MT Mobile Terminal
MT-C Communication Channel Between Mobile Terminal and Feederlink Earth Station
MT-DRd Inbound Slotted Aloha Data Channel
MT-DRr Inbound Slotted Aloha Reservation Channel
MT-DT Inbound Packet Time Division Multiple Access Channel
MT/NR Mobile Terminal/Net Radio
MT ASK Mobile Terminal Access Security Key
MTBF Mean-Time Between Failures
MTBRA Mean-Time Between Restoral Actions
MTCRS Mobile Telephone Cellular Roaming Service
MT-MET Mobile Terminal to Mobile Terminal
MT-MT Mobile Terminal to Mobile Terminal
MTP Mobile Data Service Transaction Protocol
MT-PSTN Mobile Terminal/Public Switched Telephone Network
MTS Mobile Telephone Service
MT-SR Random Access Signaling Channel from Mobile Terminal to Group Controller
MTSR MTP Statistics Request
MT-ST Time Division Multiple Access Signaling Channel from Mobile Terminal to Group Controller
MTTR Mean-Time to Repair
MTX Mobile Telephone Exchange
MULP Mobile Data Service Unacknowledged Link Protocol
MUSR MULP Statistics Request
NACN North American Cellular Network
NADP North American Dialing Plan
NANP North American Numbering Plan
NAP Network Access Processor
NAP-C Network Access Processor for the Communications Channel
NAP-CU Network Access Processor-Channel Unit
NAP-D Network Access Processor for the Data Channel
NAP-N Network Access Processor for the Network Radio Channel
NAP-S Network Access Processor for the Signaling Channel
NAS Network Access Subsystem
NASP National Aerospace Plan
NCC Network Communications Controller
NCC Network Control Center
NCC-RE Network Communications Controller Radio frequency Equipment
NCC-TE Network Communications Controller Terminal Equipment
NCS Network Control System
NCU Net Radio Control Unit
NCU Net Radio Channel Unit
NE Network Engineering
NEBS New Equipment Building System
NE/SE Network Engineering/System Engineering
NIM Network Module
NM Network Module
NMP Network Management Process
NMS Network Management System
NMS/CMIS Network Management System/Customer Management Information System
NOC Network Operations Center
NOC-FES Network Operations Center-Feederlink Earth Station
NPA Numbering Plan Area
NR Net Radio
NRCHA Net Radio Channel Assignment
NRCHREL Net Radio Channel Release
NRCHREQ Net Radio Channel Request
NRDVI Net Radio Dispatcher Voice Interface NRS Net Radio Service
NRZ Non-Return to Zero
NT Northern Telecom
NTL Northern Telecom Limited
NTP Northern Telecom Practice
NVM Non-Volatile Memory
OA&M Operation, Administration, and Maintenance
O&M Operations and Maintenance
OJJ On the Job Training
OM Operational Measurements (from GWS)
OS Operating System
OSF Open Software Foundation
OSI Open Systems Interconnection
OSR Operational Support Review
PA Product Assurance
PAC Pre-emption Acknowledge Message
PAD Packet Assembler/Disassembler
PAP Product Assurance Plan
PBX Private Branch Exchange
PC Process Control
PCM Pulse Code Modulation
PC-RFMCP PC Based RFM Control Processor
PC-SCP PC Based Systems Control Processor
PCSTR Physical Channel Statistics Request
PCT Provisioning Criteria Table
PCU Pilot Control Unit
PCU Pilot Channel Unit
PDAMA Priority Demand Assignment Multiple Access
PDN Packet Data Network
PDR Preliminary Design Review
PDU Protocol Data Unit
PE Protocol Extension
PER Packet Error Rate
PERSP Packet Error Rate Sample Period
PERT Packet Error Rate Threshold
PIP Program Implementation Plan
PLP Packet Layer Protocol
PLT Pilot
PMR Project Management Review
PMT Pre-emption Message
PN Private Network
PN Pseudo Noise
PNIC Private Network Identification Code
PPM Pulses per Minute
PS Processor Subsystem
PSDN Private Switched Data Network
PSDN Public Switched Data Network
PSTN Public Switched Telephone Network
PTT Push-To-Talk
PVC Performance Virtual Circuit
PVT Permanent Verification Test/Performance Verification Test
Q Quadrature Phased Channel
QA Quality Assurance
Q bit 'Qualified Data' bit in X.25
QPSK Quadrature Phase Shift Keying
RAM Random Access Memory
RAM Reliability, Availability, Maintainability
RDB Relational DataBase
REMS Remote Environmental Monitoring System
Req Requirement
Rev Revision
RF Radio Frequency
RFE Radio Frequency Equipment
RF IFL Radio Frequency Inter Facility Link
RFM Radio Frequency Monitor
RFP Request For Proposal
RFS Radio Frequency Subsystem
RHCP Right Hand Circularly Polarized
RMS Remote Monitoring Station
RMS Remote Monitor Subsystem
RNO Remote NOC Operator
ROM Read Only Memory
RR Receiver Ready
RS Requirements Specification
RS-232C Electronics Industry Standard for unbalanced data circuits
RSP Radio Standard Procedure
RTIN Reverse Terminal Identification Number
RTM Requirements Traceability Matrix
RTP Reliable Transaction Protocol
RTR Reliable Transaction Router
RTS Reliable Transaction Service
RTS Receiver/Tuner System
Rx receive
S/W Software
SCADA Supervisory Control and Data Acquisition
SCCP Signaline Connection Control Part
SCPC Single Channel Per Carrier
SCR Software Change Request
SCS System Common Software
SCU Signaling Channel Unit
SDD Software Design Description
SDID Seller Data Item Description
SDLC Synchronous Data Link Control
SDP Software Development Plan
SDPAP Software Development Product Assurance Plan
SDR System Design Review
SDRL Seller Data Requirements List
SE Systems Engineering
SEC Setup Complete Message
SEDP Software Engineering Development Plan
SEE Software Engineering Environment
SEEP Software Engineering Environment Plan
SID System Identifier Code
SIF System Integration Facility
SIT Special Information Tones
SLOC Source Lines of Code
SLSS Station Logic and Signaling Subsystem
SM Site Manager
SMAC Station Monitor Alarm and Control Subsystem
SMDS Satellite Mobile Data Service
SMP Software Management Plan
SMRS Satellite Mobile Radio Service
SMSC Satellite Mobile Switching Center
SMTS Satellite Mobile Telephone Service
SNA Systems Network Architecture
SNAC Satellite Network Access Controller
SNACS Satellite Network Access Controller Subsystem
SNMP Simple Network Management Protocol
SNR Signal to Noise Ratio
SOC Satellite Operation Center
SOW Statement of Work
SP Start Pulse
SPAP Software Product Assurance Plan
SPP Satellite Protocol Processor
SQL Software Query Language
SRR Systems Requirements Review
SRS Software Requirements Specification
SS7 Signaling System No. 7
SSA Sloppy Slotted Aloha
SSTS Satellite Transmission Systems, Inc.
STP Signal Transfer Point
STP System Test Program STS System Test Station.
STSI Satellite Transmission Systems, Inc.
SU Signaling Unit
SUES Shared-Use Earth Station
SVC Switched Virtual Circuit
SVVP Software Verification and Validation Plan
SVVPR Software Verification and Validation Plan Review
S/W Software
[TI] Top Level Specification
T-1 digital transmission link, 1.544 mega-bits per second
TCP/IP Transmission Control Protocol/Internet Protocol
TCAP Transactions Capabilities Application Part
TCF Training Check Frame
TD Transmission Demonstration
TDM Time Division Multiplex
TDMA Time Division Multiple Access
TDMSI Time Division Multiplex Selector ID
TE Terminal Equipment
Telecom Telephonic Communications
TDM Time Division Multiplex
TDMA TDM Access
TID Terminal Identification
TIM Timing
TIM Technical Interchange Meeting
TIM Terminal Identification Number
TIS Terrestrial Interface Subsystem
TLCSC Top Level Computer Software Component
TLS Top Level Specification
TMI Telesat Mobile Incorporated
TMS Test and Monitor Station
TNI Terrestrial Network Interface
TPP Test Plan and Procedure
TT&C Telemetry, Tracking and Control
TX Transmit
UCN Up Converter
UDS Unacknowledged Data Delivery Service
UIS User Interface Subsystem
UPC Uplink Power Control
UTR Universal Tone Receiver
UW Unique Words
V&V Verification and Validation
VAC Value-Added Carrier
VAX Model Identification of a Digital Equipment Corporation System
VAX Virtual Address Extension (proprietary name used by DEC for some of its computer systems)
VCN Virtual Circuit Number
VF Voice Frequency
VLR Visitor Location Register
VN Virtual Network
VPN Virtual Private Network
VUP Vax Unit of Processing
V.22bis Modem Standard for 24( )0 Baud Service Over Telephone Lines
V.25 Procedure for setting up a data connection on the Public Switched Telephone Network
V.26, V.28 Electrical specification of interchange circuits at both the data terminal equipment and data communications equipment sides of the interface (similar to RS-232-C)
V.32 High Speed Serial Link, Physical Layer Definition
V.35 X.25 physical layer interface used to access wideband channels (at data rates up to 64 kbit/s)
WAN Wide Area Network
XCR X.25 Configuration Request
XCID External Interface Control Document
XICWG External Interface Control Working Group
X.3 Specification for facilities provided by the Packet Assembler/Disassembler
X.21 X.25 physical layer interface for Data Terminal Equipment and data communications equipment using synchronous transmission facilities
X.21bis X.25 physical layer interface for Data Terminal Equipment designed for interfacing to synchronous V-series modems to access data networks
X.25 Specification for interface between Data Terminal Equipment and Data Communications Equipment for terminals operating in packet mode
X.28 Specification for interaction between loval terminal and Packet Assembler/Disassembler
X.29 Specification for interaction between Packet Assembler/Disassembler and remote packet mode terminal

What is claimed is:

1. In a mobile satellite system including a satellite communication switching office having a satellite antenna for receiving/transmitting a satellite message via a satellite from/to a vehicle using a mobile communication system, a satellite interface system, a central controller receiving/transmitting the satellite message from/to the satellite communication switching office issued from the vehicle via the satellite and the satellite interface system, the mobile communication system comprising a user interface system providing a user interface through which a user has access to services supported by the mobile satellite system, an antenna system providing an interface between the mobile communication system and the mobile satellite system via the satellite interface system, and receiving a first satellite message from the satellite and transmitting a second satellite message to the satellite, a transceiver system, operatively connected to said antenna system, including a receiver and a transmitter, the transmitter converting the second satellite message including at least one of voice, data, fax and signaling signals into a modulated signal, transmitting the modulated signal to said antenna system, the transmitter including an amplifier, a first converter and associated first frequency synthesizer, a modulator, an encoder, multiplexer, scrambler and frame formatter for at least one of voice, fax, and data, the receiver accepting the first satellite message from the antenna system and converting the first satellite message into at least one of voice, data, fax and signaling signals, at least one of the voice, data and fax signals routed to the user interface system, the receiver including a second converter with an associated second frequency synthesizer, a demodulator, a decoder, demultiplexer, descrambler and frame unformatter for at least one of voice, fax, and data and a logic and signaling system, operatively connected to said transceiver, controlling initialization of the mobile communication system, obtaining an assigned outbound signaling channel from which updated system information and commands and messages are received, said logic and signaling system configuring said transceiver for reception and transmission of at least one of voice, data, fax and signaling messages, and controlling protocols between the mobile communication system and the mobile satellite system, and validating a received signalling messages and generating codes for a signaling message to be transmitted, a method of providing satellite communication between multiple users in a closed user group arrangement, said method comprising the steps of:

(a) first and second mobile earth terminals (METS) registering with the mobile satellite system;

(b) the first MET selecting a closed user group network identifier (NET ID) representing a NET group including the first and second METs to establish voice communication therewith;

(c) the first MET transmitting the NET ID to the central controller;

(d) the central controller receiving the NET ID, validating the first MET for communication, validating the NET ID, allocating a frequency for the NET group, and broadcasting the message to the NET group including the second MET informing the NET group of the allocated frequency and the voice communication associated therewith;

(e) the second MET tuning to the frequency in response to the message broadcast by the central controller;

(f) assigning by the central controller the first MET as current speaker for the NET group;

(g) monitoring by the first and second METs whether at least one of a dispatcher message, a priority message and a release of speaker message has been issued, and if so, interrupting the current speaker with the at least one of the dispatcher message, the priority message and a new speaker;

(h) monitoring by the central controller whether the current speaker is active, and if not, removing the current speaker and setting the current speaker to vacant;

(i) notifying by the central controller the first and second METs that the current speaker is vacant;

(j) initiating by one of the first and second METs a request to be the new speaker;

(k) receiving by the central controller the request from a first of the one of the first and second METs to be the new speaker, and assigning the first of the one of the first and second METs as the new speaker; and (l) releasing the closed user group communication when no request from the one of the first and second METs is made to be the new speaker for a predetermined period of time.

2. The method according to claim 1, further comprising the steps of:

(1) a third MET included in the NET group registering with the mobile satellite system;

(2) the central controller broadcasting the message to the NET group including the third MET informing the NET group of the allocated frequency and the voice communication associated therewith;

(3) the third MET generating a scrambling vector for access to the voice communication; and (4) the third MET tuning to the allocated frequency for the NET group using the scrambling vector to gain access thereto.

3. The method according to claim 1, wherein the central controller controls the closed user group satellite communication including net radio parameters used by the first and second METS.

4. The method according to claim 1, wherein the central controller selectively downloads the NET IDs to the first and second METs according to predetermined user criteria.

5. The method according to claim 4, wherein the central controller collects billing information regarding the closed user group satellite communication and transmits the billing information to the mobile satellite system, and wherein the mobile satellite system charges a service fee to a customer that has requested the closed user group arrangement.

6. The method according to claim 1, further comprising the steps of:

(1) a non-MET accessing the mobile satellite system via one of a public switched telephone network and a cellular network to initiate a closed user group communication with the NET group including at least one of the first and second METs;

(2) the central controller broadcasting the message to the NET group informing the NET group of the allocated frequency and the voice communication associated therewith; and (3) the at least one of the first and second METs tuning to the frequency in response to the message broadcast by the central controller to communicate with the non-MET in the closed user group arrangement.

7. The method according to claim 1, further comprising the steps of:

(1) the first MET selecting the closed user group network identifier (NET ID) representing a NET group including the first MET and a non-MET serviced by one of a public switched telephone network and a cellular network to establish voice communication therewith;

(2) the first MET transmitting the NET ID to the central controller;

(3) the central controller receiving the NET ID, determining that the NET group includes the non-MET, and broadcasting a non-MET message to the one of the public switched telephone network and the cellular network including the voice communication associated therewith; and (4) the one of the public switched telephone network and the cellular network receiving the non-MET message from the central controller and transmitting the non-MET message to the non-MET to establish the closed user group arrangement between the MET and the non-MET.

8. The method according to claim 1, wherein the first MET includes a push to talk (PTT) device for generating the release of speaker message, and wherein said method further comprises the steps of the first MET activating the PTT device generating a PTT signal only when the PTT device is activated after the current speaker is one of vacant or the first MET, relieving congestion on the satellite by selectively transmitting the PTT signal.

9. The method according to claim 1, wherein when the first MET activates the PTT device before one of the current speaker is vacant and the first MET, the first MET ignores the activation of the PTT device.

10. The method according to claim 1, further comprising the step of the central controller selectively downloading monitor codes to the first and second METs according to predetermined user criteria.

11. The method according to claim 10, wherein the monitor codes functioning to lock at least one of the first and second METs to the NET group preventing the NET group from being released when no request has been made by one of the first and second METs to be the current speaker after the predetermined period of time.

12. In a mobile satellite system including a satellite communication switching office having a satellite antenna for receiving/transmitting a satellite message via a satellite from/to a vehicle using a mobile communication system, a central controller receiving/transmitting the satellite message from/to the satellite communication switching office issued from the vehicle via the satellite, a method of providing satellite communication between multiple users in a closed user group arrangement, said method comprising the steps of:

(a) first and second mobile earth terminals (METs) registering with the mobile satellite system;

(b) the first MET selecting a closed user group network identifier (NET ID) representing a NET group including the first and second METs to establish voice communication therewith;

(c) the first MET transmitting the NET ID to the central controller;

(d) the central controller receiving the NET ID, validating the first MET for communication, validating the NET ID, allocating a frequency for the NET group, and broadcasting the message to the NET group including the second MET informing the NET group of the allocated frequency and the voice communication associated therewith;

(e) the second MET tuning to the frequency in response to the message broadcast by the central controller; and (f) the central controller assigning the first MET as current speaker for the NET group.

13. In a mobile satellite system including a satellite communication switching office having a satellite antenna for receiving/transmitting a satellite message via a satellite from/to a vehicle using a mobile communication system, a central controller receiving/transmitting the satellite message from/to the satellite communication switching office issued from the vehicle via the satellite, a system for providing satellite communication between multiple users in a closed user group arrangement, comprising:

first and second mobile earth terminals (METs) responsively connected to and registering with the mobile satellite system, the first MET selecting a closed user group network identifier (NET ID) representing a NET group including the first and second METs to establish voice communication therewith and transmitting the NET ID; and a central controller responsively connected to the first and second METs, the central controller receiving the NET ID from the first MET, validating the first MET for communication, validating the NET ID, allocating a frequency for the NET group, and broadcasting the message to the NET group including the second MET informing the NET group of the allocated frequency and the voice communication associated therewith, the second MET tuning to the frequency in response to the message broadcast by the central controller, and central controller assigning the first MET as current speaker for the NET group.

14. The system according to claim 13, wherein the central controller controls the closed user group satellite communication including net radio parameters used by the first and second METs.

15. The system according to claim 13, wherein the central controller selectively downloads the NET IDs to the first and second METs according to predetermined user criteria.

16. The system according to claim 15, wherein the central controller collects billing information regarding the closed user group satellite communication and transmits the billing information to the mobile satellite system, and wherein the mobile satellite system charges a service fee to a customer that has requested the closed user group arrangement.

17. The system according to claim 13, wherein a non-MET accesses the mobile satellite system via one of a public switched telephone network and a cellular network to initiate a closed user group communication with the NET group including at least one of the first and second METs, the central controller broadcasts the message to the NET group informing the NET group of the allocated frequency and the voice communication associated therewith, and the at least one of the first and second METs tunes to the frequency in response to the message broadcast by the central controller to communicate with the non-MET in the closed user group arrangement.

18. The system according to claim 13, wherein the first MET selects the closed user group network identifier (NET ID) representing a NET group including the first MET and a non-MET serviced by one of a public switched telephone network and a cellular network to establish voice communication therewith, and transmits the NET ID to the central controller, the central controller receives the NET ID, determines that the NET group includes the non-MET, and broadcasts a non-MET message to the one of the public switched telephone network and the cellular network including the voice communication associated therewith, and the one of the public switched telephone network and the cellular network receives the non-MET message from the central controller and transmits the non-MET message to the non-MET to establish the closed user group arrangement between the MET and the non-MET.

19. The system according to claim 13, wherein the first MET includes a push to talk (PTT) device for generating the release of speaker message, and wherein when the first MET activates the PTT device, a PTT signal is generated only when the PTT device is activated after the current speaker is one of vacant or the first MET, relieving congestion on the satellite by selectively transmitting the PTT signal.

20. The system according to claim 13, wherein when the first MET activates the PTT device before one of the current speaker is vacant and the first MET, the first MET ignores the activation of the PTT device.

21. The system according to claim 13, wherein the central controller selectively downloads monitor codes to the first and second METs according to predetermined user criteria.

22. The system according to claim 21, wherein the monitor codes functioning to lock at least one of the first and second METs to the NET group preventing the NET group from being released when no request has been made by one of the first and second METs to be the current speaker after the predetermined period of time.

23. The system according to claim 13, further comprising a third MET responsively connected to said central controller and included in the NET group registering with the mobile satellite system, and wherein the central controller broadcasts the message to the NET group including the third MET informing the NET group of the allocated frequency and the voice communication associated therewith, the third MET generating a scrambling vector for access to the voice communication, and tuning to the allocated frequency for the NET group using the scrambling vector to gain access thereto.

* * * * *